United States Patent
Lim et al.

(10) Patent No.: US 10,930,977 B2
(45) Date of Patent: Feb. 23, 2021

(54) ELECTROCHEMICAL DEVICE

(71) Applicant: Samsung Electronics Co., Ltd., Suwon-si (KR)

(72) Inventors: Sungjin Lim, Seongnam-si (KR); Huisu Jeong, Seongnam-si (KR); Kyounghwan Kim, Seoul (KR); Hwiyeol Park, Hwaseong-si (KR); Jeongkuk Shon, Hwaseong-si (KR); Wooyoung Yang, Hwaseong-si (KR); Jaemyung Lee, Seoul (KR); Junhyeong Lee, Seoul (KR); Jin S. Heo, Hwaseong-si (KR)

(73) Assignee: SAMSUNG ELECTRONICS CO., LTD., Gyeonggi (KR)

( * ) Notice: Subject to any disclaimer, the term of this patent is extended or adjusted under 35 U.S.C. 154(b) by 120 days.

(21) Appl. No.: 16/049,888

(22) Filed: Jul. 31, 2018

(65) Prior Publication Data
US 2019/0214674 A1    Jul. 11, 2019

(30) Foreign Application Priority Data

Jan. 11, 2018 (KR) .......................... 10-2018-0003972

(51) Int. Cl.
*H01M 10/058*     (2010.01)
*H01M 10/0562*    (2010.01)
(Continued)

(52) U.S. Cl.
CPC ..... *H01M 10/058* (2013.01); *H01M 10/0454* (2013.01); *H01M 10/0562* (2013.01);
(Continued)

(58) Field of Classification Search
None
See application file for complete search history.

(56) References Cited

U.S. PATENT DOCUMENTS

| | | | |
|---|---|---|---|
| 7,875,387 B2 | 1/2011 | Nakano et al. | |
| 8,795,885 B2 | 8/2014 | Prieto et al. | |
(Continued)

FOREIGN PATENT DOCUMENTS

| JP | 5181413 B2 | 4/2013 |
|---|---|---|
| KR | 1020170055325 A | 5/2017 |
(Continued)

OTHER PUBLICATIONS

Jie Xie et al., "Chemical Vapor Deposition of Lithium Phosphate Thin-Films for 3D All-Solid-State Li-Ion Batteries," Journal of the Electrochemical Society, Dec. 9, 2014, pp. A249-A254, vol. 162, Issue 3.

(Continued)

*Primary Examiner* — Daniel S Gatewood
(74) *Attorney, Agent, or Firm* — Cantor Colburn LLP

(57) ABSTRACT

An electrochemical device including: a positive electrode current collector; a plurality of positive electrodes disposed on the positive electrode current collector; an electrolyte layer disposed on the plurality of positive electrodes; a negative electrode disposed on the electrolyte layer; and a negative electrode current collector disposed on the negative electrode, wherein the electrolyte layer includes a first electrolyte layer and a second electrolyte layer, and wherein the second electrolyte layer is between the first electrolyte layer and the negative electrode.

24 Claims, 18 Drawing Sheets

(51) Int. Cl.
   *H01M 10/0583* (2010.01)
   *H01M 10/04* (2006.01)
   *H01M 4/02* (2006.01)
   *H01M 2/16* (2006.01)
   *H01M 2/18* (2006.01)

(52) U.S. Cl.
   CPC ...... *H01M 10/0583* (2013.01); *H01M 2/1686* (2013.01); *H01M 2/18* (2013.01); *H01M 2004/021* (2013.01); *H01M 2004/025* (2013.01); *H01M 2004/028* (2013.01)

(56) References Cited

U.S. PATENT DOCUMENTS

| | | | |
|---|---|---|---|
| 2012/0015253 A1* | 1/2012 | Matsuda | H01M 4/0404 429/233 |
| 2014/0057169 A1 | 2/2014 | George et al. | |
| 2016/0204464 A1* | 7/2016 | Cho | H01M 10/0472 429/162 |
| 2016/0226061 A1 | 8/2016 | Zheng et al. | |
| 2017/0104235 A1 | 4/2017 | Cho et al. | |
| 2017/0133710 A1* | 5/2017 | Yoon | H01M 10/0562 |
| 2017/0149034 A1 | 5/2017 | Jeong et al. | |
| 2018/0114974 A1 | 4/2018 | Park et al. | |
| 2018/0375092 A1 | 12/2018 | Park et al. | |
| 2019/0051942 A1 | 2/2019 | Jeong et al. | |

FOREIGN PATENT DOCUMENTS

| | | |
|---|---|---|
| WO | 2013112135 A1 | 8/2013 |
| WO | 2017105234 A1 | 6/2017 |

OTHER PUBLICATIONS

European Search Report for European Patent Application No. 18210269.9 dated May 27, 2019.

* cited by examiner

ELECTROCHEMICAL DEVICE

CROSS-REFERENCE TO RELATED APPLICATION

This application claims priority to and the benefit of Korean Patent Application No. 10-2018-0003972, filed on Jan. 11, 2018, in the Korean Intellectual Property Office, and all the benefits accruing therefrom under 35 U.S.C. § 119, the content of which is incorporated herein in its entirety by reference.

BACKGROUND

1. Field

The present disclosure relates to an electrochemical device.

2. Description of the Related Art

As technology in the electronics field has developed, the market for various portable and wearable electronic devices has grown. Such devices include cellular phones, game devices, portable multimedia players ("PMPs"), MPEG audio layer-3 ("MP3") players, smartphones, smart pads, e-readers, tablet computers, and mobile medical devices. Accordingly, with an increase in the demand for portable electronic devices, demand for batteries suitable for powering portable electronic devices has also increased.

Secondary batteries refer to batteries capable of charging and discharging, whereas primary batteries are not rechargeable. As a secondary battery, a lithium battery has a higher voltage and a greater specific energy than a nickel-cadmium battery or a nickel-hydrogen battery. In recent years, for the purpose of increasing the capacity of lithium secondary batteries, studies have been performed on lithium secondary batteries that include electrodes of a three-dimensional ("3D") structure.

SUMMARY

Provided is an electrochemical device including an electrolyte layer having a multilayered structure capable of reducing a short-circuit rate during charge and discharge by improving a step coverage.

Additional aspects will be set forth in part in the description which follows and, in part, will be apparent from the description, or may be learned by practice of the presented embodiments.

According to an aspect of an embodiment, an electrochemical device includes: a positive electrode current collector; a plurality of positive electrodes disposed on the positive electrode current collector; an electrolyte layer disposed on the plurality of positive electrodes; a negative electrode disposed on the electrolyte layer; and a negative electrode current collector disposed on the negative electrode, wherein the electrolyte layer includes a first electrolyte layer and a second electrolyte layer, wherein the second electrolyte layer is between the first electrolyte layer and the negative electrode.

Also disclosed is a method of forming an electrochemical device, the method including: disposing a positive electrode on a first surface of a positive electrode current collector; disposing a first electrolyte layer including a first electrolyte on a first surface of the positive electrode by a wet method, the first surface of the positive electrode being orthogonal to the first surface of the positive electrode current collector; disposing a second electrolyte layer on the first electrolyte layer; disposing a negative electrode on the second electrolyte layer; and disposing a negative electrode current collector on the negative electrode to provide the electrochemical device, wherein a thickness of the first electrolyte layer on the first surface of the positive electrode at a location proximate to the positive electrode current collector is greater than a thickness of the first electrolyte layer on the first surface of the positive electrode at a location distal to the positive electrode current collector, and wherein a thickness of the first electrolyte layer on the first surface of the positive electrode at a location proximate to the positive electrode current collector is less than a thickness of the first electrolyte layer at a location distal to the positive electrode current collector.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
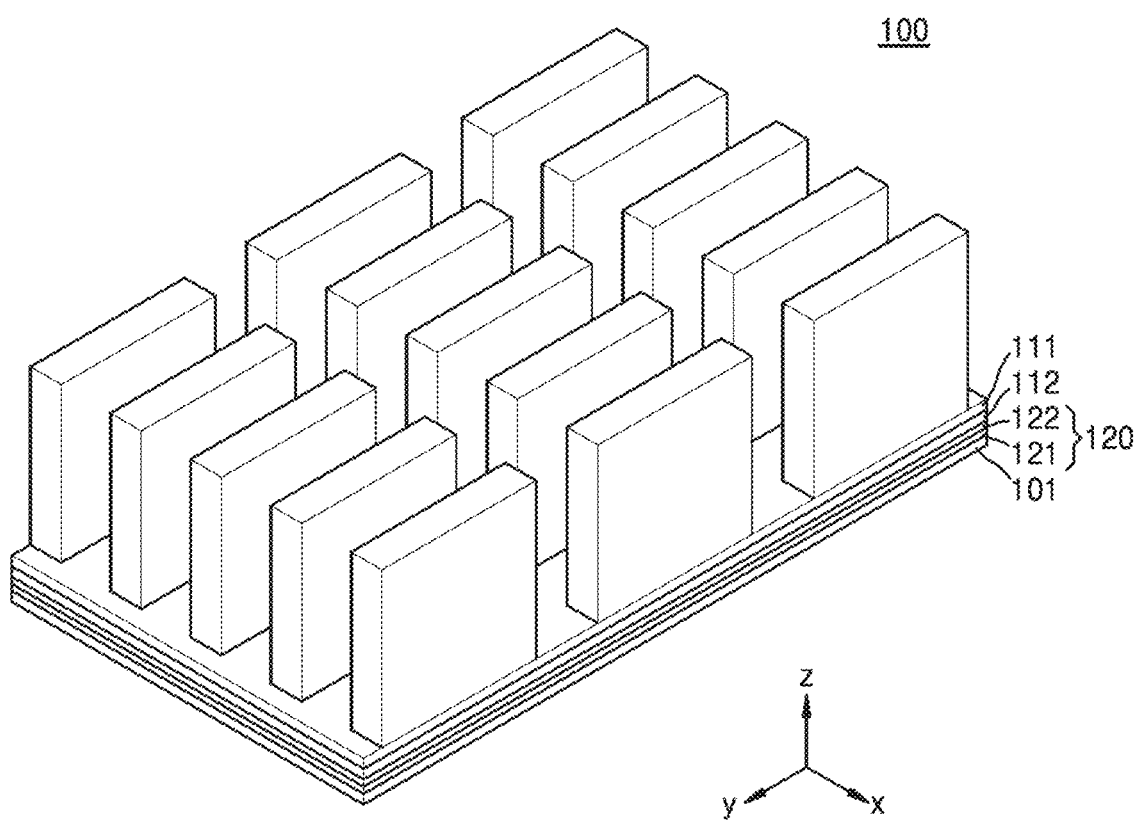
FIG. 1 is a schematic perspective view of an embodiment of the structure of an electrochemical device.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that, although the terms "first," "second," "third," etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of an electrochemical device and a method of manufacturing the electrochemical device will be described in detail with reference to the attached drawings.

Figure 2:
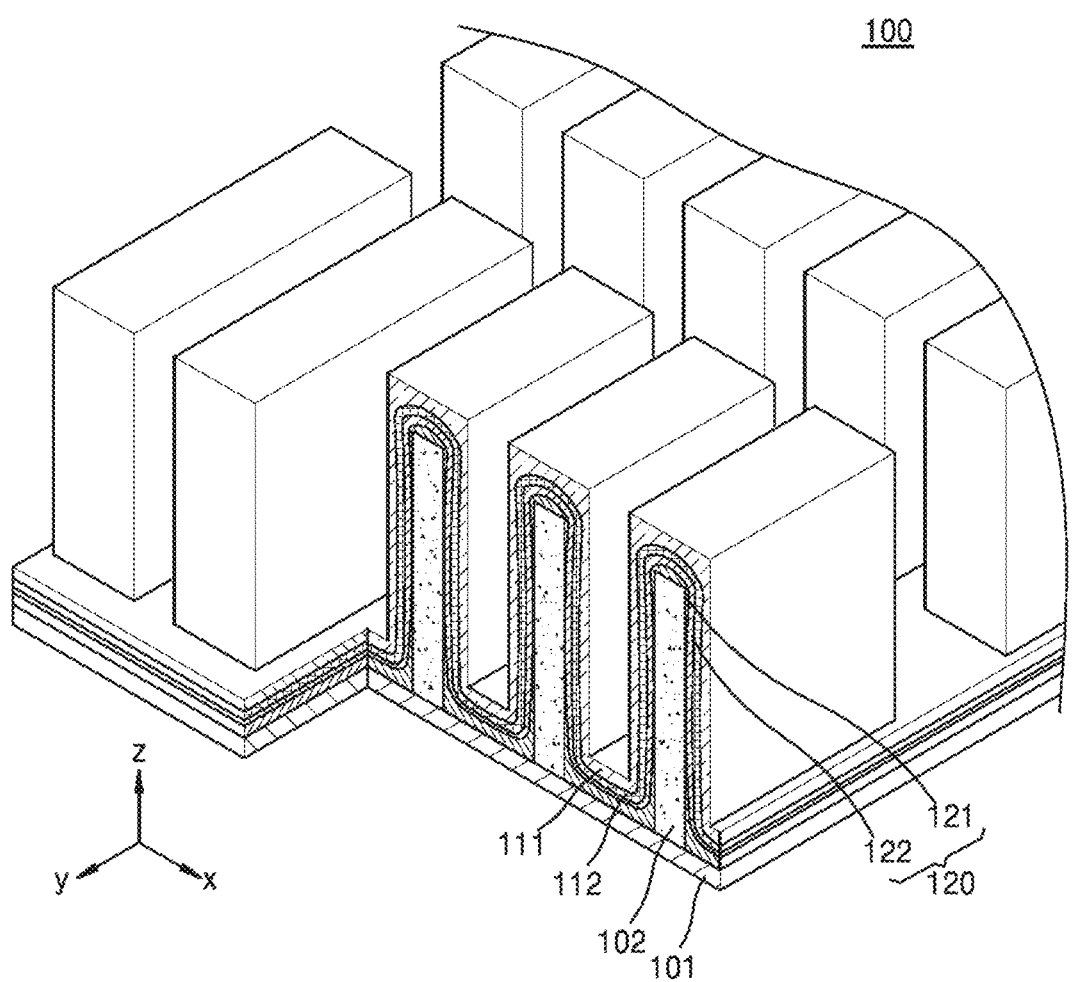
FIG. 2 is a perspective view partially illustrating the inside of the electrochemical device of FIG. 1.
Figure 3:
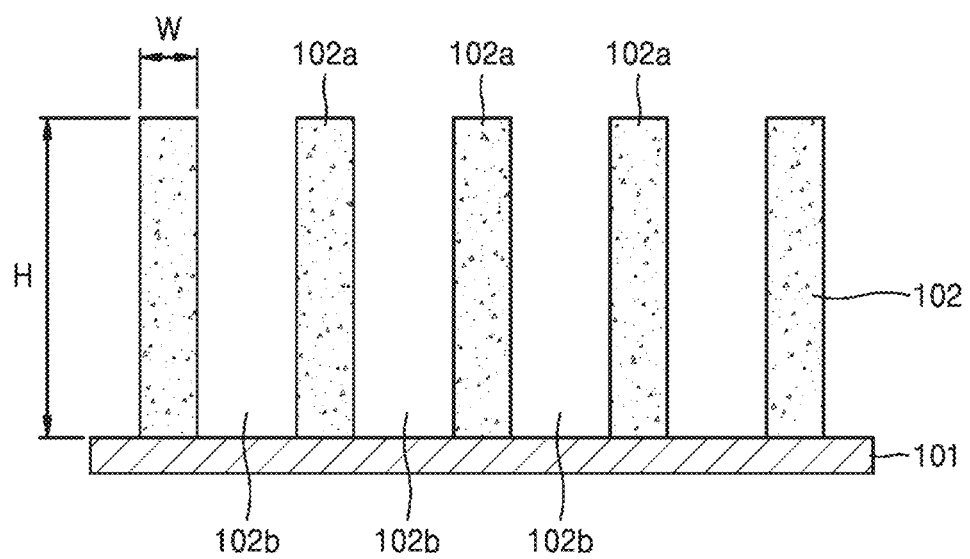
FIG. 3 is a partial cross-sectional view of the electrochemical device of FIG. 1.
Figure 4A:
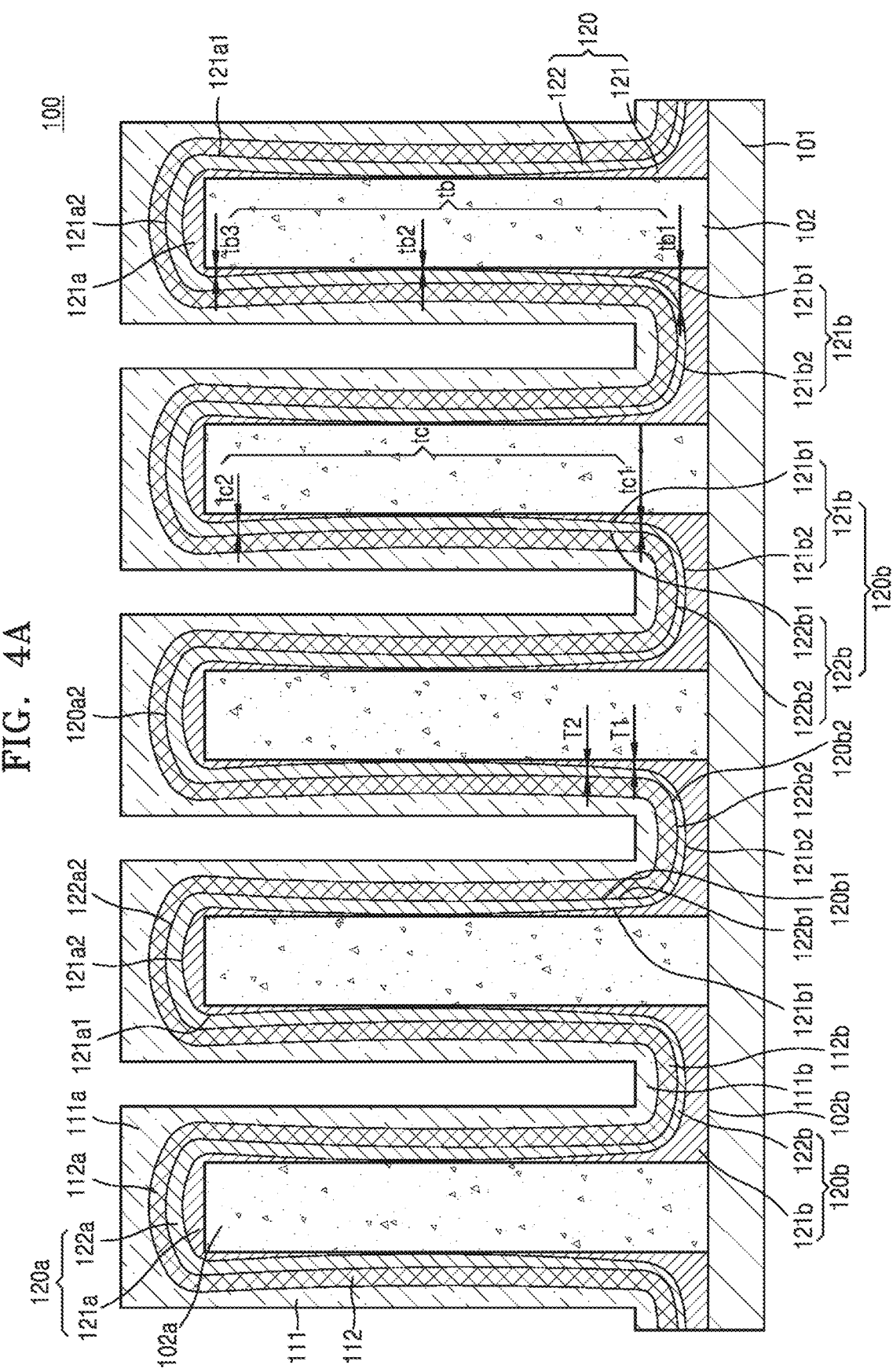
FIG. 4A is a cross-sectional view of the electrochemical device of FIG. 1.

FIG. 1 is a schematic perspective view of the structure of an embodiment of an electrochemical device. FIG. 2 is a perspective view partially illustrating the inside of the electrochemical device of FIG. 1. FIG. 3 is a partial cross-sectional view of the electrochemical device of FIG. 1, in which only a positive electrode current collector and a positive electrode of the electrochemical device are illustrated and other parts thereof are omitted for convenience of description. FIG. 4A is a cross-sectional view of the electrochemical device of FIG. 1. Referring to FIG. 1 to FIG. 4A, an electrochemical device 100 according to an embodiment includes a positive electrode current collector 101, a plurality of positive electrodes 102, an electrolyte layer 120, a negative electrode 112, and a negative electrode current collector layer 111. The electrolyte layer 120 includes a first electrolyte layer 121 and a second electrolyte layer 122. In an embodiment the first electrolyte layer is directly on the positive electrode and the second electrolyte layer is between the first electrolyte layer and the negative electrode. The plurality of positive electrodes 102 is in electrical contact with the positive electrode current collector 101. In an embodiment, each positive electrode of the plurality of positive electrodes 102 is in electrical contact with the positive electrode current collector 101, the positive electrodes are spaced apart from each other in a direction (e.g., a x-direction of FIG. 2), and the positive electrodes protrude from the positive electrode current collector 101, e.g., in a z-direction of FIG. 2. The electrochemical device 100 includes a first protruding portion 102a including each positive electrode of the plurality of positive electrodes 102. The first protruding portions define a first indented portion 102b between adjacent positive electrodes of the plurality of positive electrodes 102.

The electrolyte layer 120 includes a second protruding portion 120a disposed on the first protruding portion 102a, and a second indented portion 120b disposed on the first indented portion 102b. As noted above, each first protruding portion 102a comprises a positive electrode, and each first indented portion 102b is between adjacent positive electrodes 102. Further, as shown in FIG. 4A, the first electrolyte layer 121 may comprise a third protruding portion 121a disposed on the first protruding portion 102a, and a third indented portion 121b disposed on the first indented portion 102b. The second electrolyte layer 122 may comprise a fourth protruding portion 122a disposed on the third protruding portion 121a, and a fourth indented portion 122b disposed on the third indented portion 121b. The negative electrode 112 is disposed on the electrolyte 120. The negative electrode 112 includes a fifth protruding portion 112a disposed on the second protruding portion 120a, and a fifth indented portion 112b disposed on the second indented portion 120b. The negative electrode current collector layer 111 is disposed on the negative electrode 112. The negative electrode current collector layer 111 includes a sixth protruding portion 111a disposed on the fifth protruding portion 112a, and a sixth indented portion 111b disposed on the fifth indented portion 112b.

Referring to FIG. 4A, the third indented portion 121b of the first electrolyte layer 121 includes a side surface 121b1. A thickness tb of the first electrolyte layer 121 is thickest at the bottom 121b2 of the third indented portion 121b. In an embodiment, a thickness of the first electrolyte layer 121 in the x-direction of FIG. 2 may be greater at a portion of the side surface 121b1 of the third indented portion 121b proximate to the positive electrode current collector 101 than a portion of the side surface 121b1 of the third indented portion 121b distal to the positive electrode current collector 101.

The thickness tb of the first electrolyte layer 121 constituting the side surface 121b1 of the third indented portion 121b is, for example, about 2 micrometers (μm) or greater, about 3 μm or greater, about 4 μm or greater, or about 5 μm or greater, at the bottom 121b2 of the third indented portion 121b. The thickness tb of the first electrolyte layer 121 constituting the side surface 121b1 of the third indented portion 121b is, for example, about 50 μm or less, about 40 μm or less, about 30 μm or less, about 20 μm or less, about 15 μm or less, about 10 μm or less, about 9 μm or less, about 8 μm or less, about 7 μm or less, or about 6 μm or less, at the bottom 121b2 of the third indented portion 121b. The bottom 121b2 of the third indented portion 121b is proximate to the positive electrode current collector 101. As the thickness tb of the first electrolyte layer 121 constituting the side surface 121b1 of the third indented portion 121b becomes thicker in a direction towards the bottom 121b2 of the third indented portion 121b, overcharge of the positive electrode during charge and discharge, and a short circuit between the positive electrode and the negative electrode, which, while not wanting to be bound by theory, are understood to be caused by excessive reduction in the thickness of the electrolyte layer, are prevented. As a result, the structural stability and lifetime characteristics of the electrochemical device 100 are improved. The thickness tb of the first electrolyte layer 121 constituting the side surface 121b1 of the third indented portion 121b is thinnest at a point corresponding to a depth between about 10% to about 90%, about 20% to about 80%, or about 30% to about 70%, of the depth to the bottom 121b2 of the third indented portion 121b. In an embodiment, the thickness of the first electrolyte layer 121 may be thinnest at a portion of the first electrolyte layer 121 which is distal to the positive electrode current collector 101.

The depth to the bottom 121b2 of the third indented portion 121b is a vertical distance between the top surface 121a2 of the third protruding portion 121a and the bottom 121b2 of the third indented portion 121b from the positive electrode current collector 101. In an embodiment, the thickness tb of the first electrolyte layer 121 constituting the side surface 121b1 of the third indented portion 121b decreases in a direction from the bottom 121b2 of the third indented portion 121b toward the top surface 121a2 of the third protruding portion 121a, becomes thinnest at the middle portion of the third indented portion 121b, and increases at the top portion of the third indented portion 121b. In an embodiment, the thickness tb1 of the first electrolyte layer 121 constituting the side surface 121b1 of the third indented portion 121b at the bottom 121b2 of the third indented portion 121b is thicker than the thickness tb3 of the first electrolyte layer 121 constituting the side surface 121b1 of the third indented portion 121b at the top portion of the third indented portion 121b, and the thickness tb3 of the first electrolyte layer 121 constituting the side surface 121b1 of the third indented portion 121b at the top portion of the third indented portion 121b is thicker than the thickness tb2 of the first electrolyte layer 121 constituting the side surface 121b1 of the third indented portion 121b at the middle portion of the third indented portion 121b. In an embodiment, tb1>tb3>tb2.

In an embodiment, the electrolyte layer 120 may be disposed on the positive electrode current collector 101. In the x-direction of FIG. 2, a thickness tb1 of the first electrolyte layer 121 at a portion of the side surface 121b1 of the third indented portion 121b proximate to the positive electrode current collector 101 may be greater than a thickness tb3 of the first electrolyte layer 121 at a portion of the side surface 121b1 of the third indented portion 121b distal to the positive electrode current collector 101. Additionally, in the x-direction of FIG. 2, a thickness tb2 of the first electrolyte layer 121, at a portion of the side surface 121b1 of the third indented portion 121b between the portion of the side surface 121b1 of the third indented portion 121b proximate to the positive electrode current collector 101 and the portion of the side surface 121b1 of the third indented portion 121b distal to the positive electrode current collector 101, may be less than the thickness tb3 of the portion of the side surface 121b1 of the third indented portion 121b distal to the positive electrode current collector 101.

Referring to FIG. 4A, the bottom surface 121b2 of the third indented portion 121b may be a curved surface. The bottom surface 121b2 may be convex in a direction towards the positive electrode current collector 101, and may have a radius of curvature of about 10 μm or greater, about 15 μm or greater, about 20 μm or greater, about 25 μm or greater, about 30 μm or greater, about 35 μm or greater, about 40 μm or greater, about 45 μm or greater, or about 50 μm or greater, e.g., about 10 μm to about 500 μm, or about 20 μm to about 250 μm. For example, the bottom surface 121b2 of the third indented portion 121b may have a shape of a round bottom test tube. In an embodiment, at least a part of the bottom surface 121b2 of an exemplary third indented portion is a flat surface, and the connecting portion of the bottom surface 121b2 and the side surface 121b1 is a curved surface. For example, the bottom surface 121b2 of the third indented portion 121b has a shape of a test tube in which a part of the bottom thereof is flat. While not wanting to be bound by theory, is understood that because the bottom surface 121b2 of the third indented portion 121b has a convex shape in a direction towards the positive electrode current collector 101, the stress according to the volume change of the electrochemical device occurring in the region adjacent to the positive electrode current collector 101 during charge and discharge is uniformly dispersed without being concentrated on the specific region of the third indented portion 121b. As a result, the structural stability and lifetime characteristics of the electrochemical device 100 are improved.

Referring to FIG. 4A, the third protruding portion 121a of the first electrolyte layer 121 includes a top surface 121a2, and the top surface 121a2 may be a curved surface.

The top surface 121a2 may be disposed convexly in a direction opposite to the positive electrode current collector 101 and may have a radius of curvature of about 10 μm or greater, about 15 μm or greater, about 20 μm or greater, about 25 μm or greater, about 30 μm or greater, about 35 μm or greater, about 40 μm or greater, about 45 μm or greater, or about 50 μm or greater, e.g., about 10 μm to about 500 μm, or about 20 μm to about 250 μm. For example, the top surface 121a2 of the third protruding portion 121a may have a shape of an inverted round bottom test tube. In an embodiment, at least a part of the top surface 121a2 of an exemplary third protruding portion is a flat surface, and the connecting portion of the top surface 121a2 and the side surface 121a1 is a curved surface. For example, the top surface 121a2 of the third protruding portion 121a may have a shape of a test tube in which a part of the bottom thereof is flat. In an embodiment in which the top surface 121a2 of the third protruding portion 121a has a curved shape comprising a curved surface convex in the direction opposite to the positive electrode current collector 101, that is, in the direction of the negative electrode current collector 111, while not wanting to be bound by theory, is understood the stress according to the volume change of the electrochemical device occurring in the region adjacent to the negative electrode current collector 111 during charge and discharge is uniformly dispersed without being concentrated on the specific region of the third protruding portion 121a. As a result, the structural stability and lifetime characteristics of the electrochemical device 100 are improved.

Referring to FIG. 4A, the fourth indented portion 122b of the second electrolyte layer 122 includes a side surface 122b1, and the thickness tc of the second electrolyte layer 122 constituting the side surface 122b1 of the fourth indented portion 122b is thinnest at the bottom 122b2 of the fourth indented portion 122b. The thickness tc of the second electrolyte layer 122 constituting the side surface 122b1 of the fourth indented portion 122b may be, for example, about 5 μm or less, about 4 μm or less, about 3 μm less, about 2 μm less, about 1 μm less, about 0.5 μm or less, or about 0.1 μm less, or about 0.1 μm to about 50 μm, or about 0.5 μm to about 25 μm, at the bottom 122b2 of the fourth indented portion 122b. The thickness tc of the second electrolyte layer 122 constituting the side surface 122b1 of the fourth indented portion 122b decreases toward the bottom 122b2 of the fourth indented portion 122b.

In an embodiment, the thickness tc1 of the second electrolyte layer 122 constituting the side surface 122b1 of the fourth indented portion 122b at the bottom 122b2 of the fourth indented portion 122b is thinner than the thickness tc2 of the second electrolyte layer 122 constituting the side surface 122b1 of the fourth indented portion 122b at the top of the fourth indented portion 122b. In an embodiment, tc2>tc1.

Referring to FIG. 4A, the second indented portion 120b of the electrolyte layer 120 including the first electrolyte layer 121 and the second electrolyte layer 122 includes a side surface 120b1. The ratio T2/T1 of the thickness T1 of the first electrolyte layer constituting the side surface 120b1 of the second indented portion to the thickness T2 of the second electrolyte layer is, for example, about 0.5 or less, about 0.4 or less, about 0.3 or less, about 0.2 or less, or about 0.1 or less, or about 0.5 to about 0.001, or about 0.3 to about 0.01, at the bottom 120b2 of the second indented portion 120b. In an embodiment, the electrolyte layer 120 may be disposed on the positive electrode current collector 101, the second indented portion 120b of the electrolyte layer 120 may include a side surface 120b1, and a ratio T2/T1 of a thickness T2 of the second electrolyte layer 122 in the x-direction of FIG. 2 to a thickness T1 of the first electrolyte layer 121 in the x-direction of FIG. 2 may be about 0.5 to about 0.001 at a portion of the side surface 120b1 of the second indented portion 120b proximate to the positive electrode current collector 101.

At a point corresponding to a depth between 30% and 70% of the depth to the bottom 120b2 of the second indented portion 120b, the ratio T2/T1 may be, for example, about 1 or greater, about 1.1 or greater, about 1.2 or greater, about 1.3 or greater, about 1.4 or greater, about 1.5 or greater, about 2 or greater, about 5 or greater, or about 10 or greater, or about 1 to about 100, or about 5 to about 50, wherein T1 is the thickness of the first electrolyte layer constituting the side surface 120b1 of the second indented portion 120b and T2 is the thickness of the second electrolyte layer. In an embodiment, the ratio T2/T1 may be about 1 to about 50, or about 5 to about 25 at a distance which is about 30% to about 70% of a total distance from the portion of the second electrolyte layer 122 farthest from the positive electrode current collector 101 to the portion of the side surface 120b1 of the second indented portion 120b closest to the positive electrode current collector 101.

The depth to the bottom 120b2 of the second indented portion 120b is a vertical distance between the top surface 120a1 of the second protruding portion 120a and the bottom 120b2 of the second indented portion 120b from the positive electrode current collector 101. Therefore, the ratio T2/T1 of the thickness T1 of the first electrolyte layer to the thickness T2 of the second electrolyte layer is greatest at the middle portion of the depth to the bottom 120b2, and decreases as the depth to the bottom 120b2 increases. Since the thickness T1 of the first electrolyte layer constituting the side surface 120b1 of the second indented portion 120b and the thickness T2 of the second electrolyte layer constituting the side surface 120b1 of the second indented portion 120b respectively changes according to the depth to the bottom 120b2, the uniformity of thickness (T1+T2) of the electrolyte layer 120 is improved.

Figure 4B:
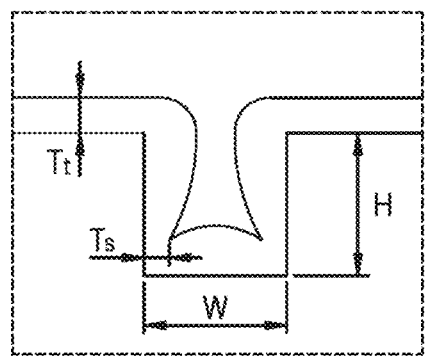
FIG. 4B is a cross-sectional view an embodiment of illustrating a side step coverage.

An exemplary electrolyte layer 120 has a high side step coverage. Referring to FIG. 4B, the side step coverage ("SCs") of the electrolyte layer 120 calculated by Equation 1 below is about 30% or greater, about 35% or greater, about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, or about 99% or greater, or about 30% to about 99.9%, or about 40% to about 99%. Referring to FIG. 4A, in an embodiment the second electrolyte layer 122 is thickly disposed at a portion where the first electrolyte layer 121 is thinly disposed, and the second electrolyte layer 122 is thinly disposed at a portion where the first electrolyte layer 121 is thickly disposed, so that the electrolyte layer 120 has a high SCs.

$$SCs = Ts/Tt \times 100\% \qquad \text{Equation 1}$$

In Equation 1, Ts represents a thickness at the thinnest point in the step and Tt represents a thickness of a flat surface in the step, and in FIG. 4B, H represents a height of the step, and W represents a width of the step.

Referring to FIG. 4A, a hollow space defined by the sixth indented portion 111b, wherein the hollow space is between adjacent sixth portions of the plurality of sixth protruding portions 111a. While not wanting to be bound by theory, it is understood that this hollow space effectively accommodate the volume change of the electrochemical device 100, for example, the volume change of the positive electrode 102 or the negative electrode 112 during charge and discharge, thereby preventing the deterioration, such as a crack, of the positive electrode 102, the electrolyte layer 120, and/or the negative electrode 112. As a result, the structural stability and lifetime characteristics of the electrochemical device 100 are improved.

Referring to FIG. 4A, the second indented portion 120b of the electrolyte layer 120 includes side surfaces 120b1 spaced apart from each other and facing each other and a bottom surface 120b2. The angle between the side surface 120b1 and bottom surface 120b2 of the second indented portion 120b may be, for example, about 45° or greater, about 50° or more, about 55° or more, about 60° or more, about 65° or more, about 70° or more, about 75° or more, about 80° or more, about 85° or greater, or about 80° to about 100°, or about 45° to about 135°, or about 50° to about 125°. The side surface 120b1 and bottom surface 120b2 of the second indented portion 120b included in the electrolyte layer 120 substantially corresponds to the side surface 122b1 and bottom surface 122b2 of the fourth indented portion 122b included in the second electrolyte layer 122. The direction in which the bottom surface 122b2 is disposed is substantially in a direction parallel to a direction of the positive electrode current collector 101. The distance between the side surfaces 120b1 spaced apart from each other and facing each other of the second indented portion 120b is, for example, about 5 μm to about 30 μm, about 6 μm to about 25 μm, about 7 μm to about 20 μm, or about 8 μm to about 18 μm. The depth of the second indented portion 120b is about 10 μm to about 500 μm, about 20 μm to about 500 μm, about 30 μm to about 500 μm, about 40 μm to about 500 μm, about 50 μm to about 500 μm, about 60 μm to about 500 μm, about 60 μm to about 400 μm, about 60 μm to about 300 μm, about 80 μm to about 250 μm, about 100 μm to about 230 μm, or about 120 μm to about 200 μm. The depth of the second indented portion 120b is a vertical distance between the top surface 120a2 of the second protruding portion 120a and the bottom 120b2 of the second indented portion 120b from the positive electrode current collector 101. Since second indented portion 120b has such an angle, distance, and depth, the structural stability and specific energy of the electrochemical device 100 increases, and an increased discharge capacity is implemented in the same space.

Referring to FIG. 4A, the plurality of second protruding portions 120a and second indented portions 120b of the electrolyte layer 120 are electrically connected to each other, and this electrical connection is maintained even after charging and discharging of 100 cycles or more. The resistance of the electrolyte layer 120 after charging and discharging of 100 cycles or more is, for example, about 101% or less, about 104% or less, about 105% or less, about 110% or less, or about 120% or less, or about 80% to about 150%, or about 90% to about 125%, of the initial resistance before charging and discharging.

Referring to FIG. 4A, the surface contours of the first electrolyte layer 121 and the second electrolyte layer 122 included in the electrolyte layer 120 are different from, e.g., not parallel to, each other. The second electrolyte layer 122 has a non-conformal layer not matching the surface contour of the first electrolyte layer 121. In an embodiment, the second electrolyte layer 122 has a shape which is different from a shape of the first electrolyte layer 121, e.g., having a shape from being formed differently from the surface contour of the first electrolyte layer 121. The third indented portion 121b included in the first electrolyte layer 121 and the fourth indented portion 122b included in the second electrolyte layer 122 include side surfaces 121b1 and 122b1, respectively. The second electrolyte layer 122 constituting the side surface 122b1 of the fourth indented portion 122b may be disposed differently from the contour of the first electrolyte layer 121 constituting the side surface 121b1 of the third indented portion 121b. In an embodiment, the second electrolyte layer 122 is a non-conformal layer not matching the surface contour of the first electrolyte layer 121. The second electrolyte layer 122, unlike the a 3D electrode having conformal layers, has a different surface contour from the first electrolyte layer 121, thereby solving the problem of a short circuit occurring in an excessively thin portion of the first electrolyte layer 121.

Figure 5:
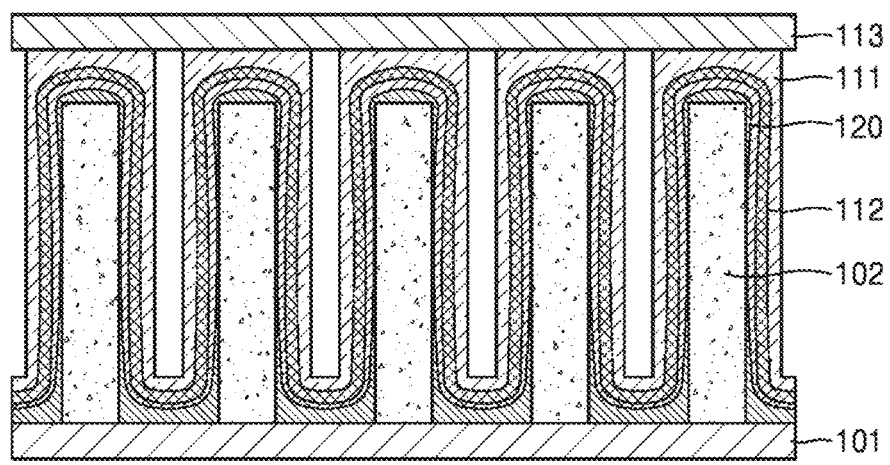
FIG. 5 is a cross-sectional view of an embodiment of an electrochemical device.

Referring to FIG. 5, a sheet-shaped negative electrode current collector 113 is additionally disposed on the negative electrode current collector layer 111. The hollow space defined, e.g., formed, between the plurality of sixth protruding portions 111a by the sixth indented portion 111b may be enclosed by the sheet-shaped negative electrode current collector 113. The hollow space may be filled with an inert gas such as nitrogen or argon, but embodiments of the inert gas are not limited thereto. Any suitable gas may be used, provided that the gas may not participate in electrochemical reactions and may not deteriorate a battery. The pressure of the hollow space is atmospheric pressure (1 atm) or less than 1 atm. The sheet-shaped negative electrode current collector 113 may be a metal foil or the like, but embodiments of the negative electrode current collector 113 are not limited thereto. Any suitable electrically conductive material may be used that may be formed in a sheet form by using an electrically conductive slurry or sputtering.

Figure 6:
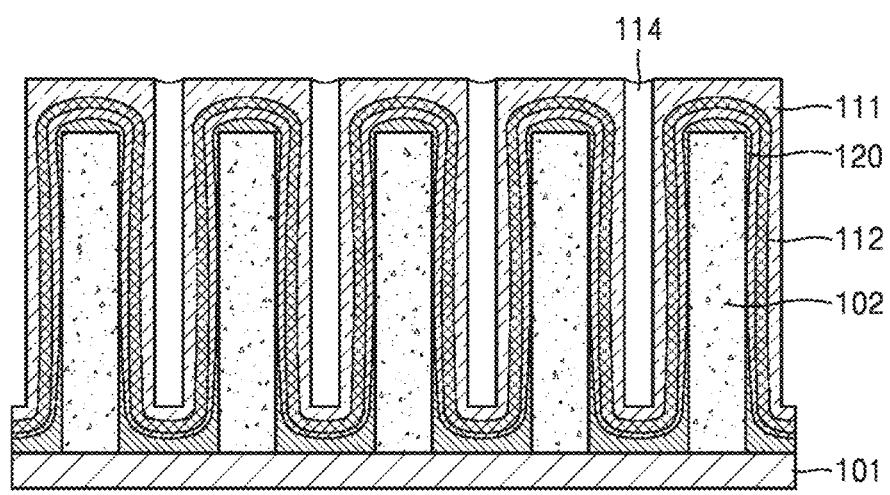
FIG. 6 is a cross-sectional view of an embodiment of an electrochemical device.

Referring to FIG. 6, a buffer layer 114 may be additionally disposed in the hollow space formed between the plurality of sixth protruding portions 111a by the sixth indented portion 111b to fill the hollow space. The buffer layer 114 effectively accommodates a volume increase of the negative electrode 112 during charge of the electrochemical device 100, and with regard to a volume decrease of the negative electrode 112 during discharge of the electrochemical device 100, the buffer layer 114 facilitates the restoration of the negative electrode current collector layer 111 to its original form before charging, thereby preventing the deterioration, such as a crack, of the electrochemical device 100. The buffer layer 114 includes an elastic material capable of changing its volume in response to an external force. The elastic material may be, for example, a natural rubber, a synthetic rubber, or a combination thereof. Examples of the synthetic rubber may include styrene-butadiene rubber ("SBR"), butadiene rubber ("BR"), isoprene rubber ("IR"), ethylene-propylene diene monomer ("EPDM") rubber, silicon rubber, an alkyl acrylate copolymer, a styrene-ethylene-butadiene-styrene copolymer, a polymethyl silane rubber, and a butyl acrylate copolymer, but embodiments of the synthetic rubber are not limited thereto. Any suitable synthetic rubber available in the art may be used as the elastic material. In an exemplary embodiment, the elastic material further includes a conductive agent. The conductive agent may be a carbonaceous conductive agent and/or a metallic conductive agent. Non-limiting examples of the conductive agent include carbon black; a graphite particulate; natural graphite; artificial graphite; acetylene black; Ketjen black; carbon fiber; carbon nanotube; a metal such as copper, nickel, aluminum, or silver, in powder, fiber, or tube form; and a conductive polymer, such as a polyphenylene derivative. Any suitable conductive agent, such as those used in the art, may be used. In an exemplary embodiment, a part of the buffer layer 114 is hollow. That is, only a portion of the buffer layer 114 includes an elastic material, while another portion thereof is hollow. A volume of the portion including an elastic material is about 90 percent by volume (volume %) or less, about 70 volume % or less, about 50 volume % or less, about 30 volume % or less, about 20 volume % or less, or about 10 volume % or less, or about 10 volume % to about 99 volume %, or about 20 volume % to about 90 volume %, based on the total volume of the buffer layer 114. The remaining portion of the buffer layer 114, if present, may be hollow. In an exemplary embodiment, the elastic material in the buffer layer 114 is porous. Because the buffer layer 114 includes the porous elastic material, the buffer layer 114 may more readily accommodate a volume change thereof during charge and discharge of the electrochemical device 100.

Referring to FIGS. 1 to 6, the second protruding portion 120a and second indented portion 120b of the electrolyte layer 120 are regularly and/or periodically arranged and arranged parallel to each other. The regular and/or periodical arrangement of the plurality of second protruding portions 120a and the plurality of second indented portions 120b enhances structural uniformity of the electrochemical device 100, thereby preventing the deterioration of the electrochemical device 100. Further, the fifth protruding portion 112a and fifth protruding portions 112b of the negative electrode 112 substantially duplicating the structure of the electrolyte layer 120 are also alternately arranged regularly and/or periodically to each other. Further, the sixth protruding portion 111a and the sixth indented portions 111b of the negative current collector layer 111 substantially duplicating the structure of the electrolyte layer 120 are also alternately arranged regularly and/or periodically to each other.

Referring to FIGS. 1 to 6, in the electrochemical device 100, a plurality of the positive electrodes 102 with a flat panel shape are disposed on the positive electrode current collector 101 in a direction perpendicular to the positive electrode current collector 101, and the positive electrodes of the plurality of the positive electrodes 102 are spaced apart and arranged in parallel. The angle between the positive electrode 102 and the positive electrode current collector 101 is, for example, about 45° to about 135°, about 50° to about 130°, about 55° to about 125°, about 60° to about 120°, about 70° to about 110°, about 80° to about 100°, or about 85° to about 95°. The aspect ratio of height H and width W of the cross section of the positive electrode 102 is, for example, about 3 or greater, about 4 or greater, about 5 or greater, about 10 or greater, about 20 or greater, about 30 or greater, about 40 or greater, or about 50 or greater, or about 3 to about 300, or about 6 to about 150. Since the positive electrode 102 has a flat panel shape, the contact area between the positive electrode 102 and the electrolyte layer 120 increases, and the movement distance of active metal ions to the electrolyte layer 120 decreases, so that the internal resistance of the electrochemical device 100 decreases, the energy density thereof increases, and the high-rate characteristics thereof are improved.

The height (height H of FIG. 3) of an exemplary positive electrode 102 is about 10 µm or greater. The height of the positive electrode 102 is, for example, about 10 µm to about 500 µm, about 10 µm to about 1 millimeters (mm), about 10 µm to about 5 mm, about 10 µm to about 1 mm, about 50 µm to about 1 mm, about 100 µm to about 500 µm, about 100 µm to about 400 µm, or about 100 µm to about 300 µm. When the height of the positive electrode 102 is too low, energy density is decreased, and when it is too high, structural stability and high-rate characteristics deteriorate. The thickness (width W of FIG. 3) of an exemplary positive electrode 102 is about 100 µm or less. The thickness of the positive electrode 102 is, for example, about 50 µm or less, about 40 µm or less, about 30 µm or less, about 20 µm or less, about 10 µm or less or about 5 µm or less, and about 0.1 µm or greater. The thickness of the positive electrode 102 is, for example, about 0.01 µm to about 50 µm, about 0.01 µm to about 40 µm, about 0.01 µm to about 30 µm, about 0.01 µm to about 20 µm, about 0.01 µm to about 10 µm, or about 0.01 µm to about 5 µm. As the thickness of the positive electrode 102 decreases, the distance between ions to the electrolyte layer 120 decreases, thereby reducing the internal resistance of the electrochemical device 100 and improving the high-rate characteristics thereof.

In an exemplary electrochemical device, a conductive adhesive layer may be additionally disposed between the positive electrode 102 and the positive electrode current collector 101. The conductive adhesive layer electrically connects the positive electrode 102 and the positive electrode current collector 101 while attaching the positive electrode 102 to the positive electrode current collector 101, and is formed using a conductive adhesive or a conductive paste.

Figure 7:
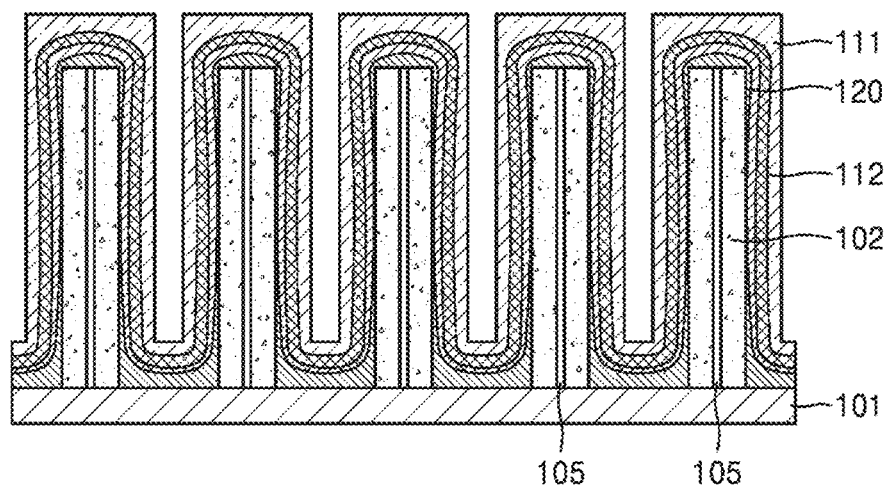
FIG. 7 a cross-sectional view of an embodiment of an electrochemical device.

Referring to FIG. 7, the electrochemical device 100 further includes a positive electrode conductor layer 105 which is in electrical contact with the positive electrode current collector 101 and is inserted into the positive electrode 102. The positive electrode conductor layer 105 and the positive electrode current collector 101 are separately formed using, for example, different materials, and then joined together, or may be formed integrally using the same conductive material. The positive electrode current collector 101 may comprise, for example, a plurality of positive electrode conductor layers 105 which vertically protrude from the surface of the positive electrode current collector 101. Although it is shown in FIG. 7 that the positive electrode conductor layer 105 has a flat panel shape, the shape of the positive electrode conductor layer 105 is not limited to this shape, and any suitable form is possible as long as it can be used for a conductor layer in the related technical field. For example, the positive electrode conductor layer 105 may have a fish-bone shape, a mesh shape, a lattice shape, or the like.

In an exemplary embodiment, the positive electrode conductor layer 105 extends from the positive electrode current collector 101 to the electrolyte layer 120 to be in contact with the electrolyte layer 120. Since the positive electrode conductor layer 105 extends to the electrolyte layer 120, electrons may more easily move in the positive electrode 102. Alternatively, in an exemplary embodiment, the positive electrode conductor layer 105 extends from the positive electrode current collector 101 to the electrolyte layer 120, and is not in contact with the electrolyte layer 120. The positive electrode conductor layers 105 may be included in all of the plurality of the positive electrodes 102, or may be included in only some of the plurality of the positive electrodes 102, and the shapes of the positive electrode conductor layers 105 may be the same or different from each other. In an exemplary embodiment, positive electrode 102 having high electronic conductivity does not include the positive electrode conductor layer 105. The thickness of the positive electrode conductor layer 105 may be, for example, about 10 µm or less, about 9 µm or less, about 8 µm or less, about 7 µm or less, about 6 µm or less, about 5 µm or less, about 4 µm or less, about 3 µm or less, about 2 µm or less, about 1 µm or less, about 0.5 µm or less, or about 0.3 µm or less, and about 0.1 µm or more, e.g., about 0.01 µm to about 10 µm.

Figure 8:
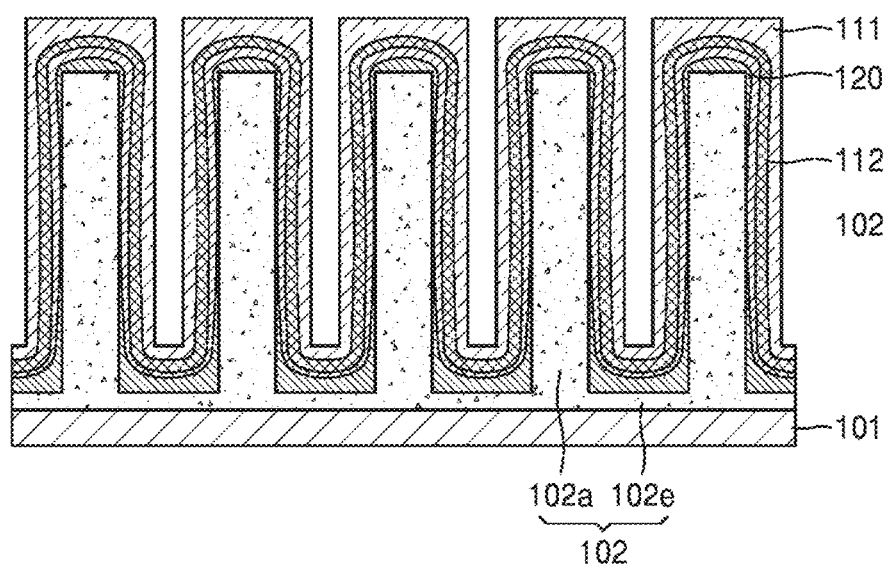
FIG. 8 is a cross-sectional view of an embodiment of an electrochemical device.

Referring to FIGS. 3 and 8, the electrochemical device 100 may further comprise a supporting portion 102e. The supporting portion 102e is disposed on the first indented portion 102b and between first protruding portions of the plurality of first protruding portions 102a, and is in contact with the first protruding portion 102a to support the first protruding portion 102a, wherein the plurality of first protruding portions 102a constitutes the plurality of positive electrodes 102. The supporting portion 102e improves structural stability of the positive electrode 102 disposed in a direction protruding from the positive electrode current collector 101, and has the same composition as the positive electrode 102 or have a different composition from the positive electrode 102. The supporting portion 102e and the first protruding portion 102a are formed integrally or stepwisely.

Figure 9A:
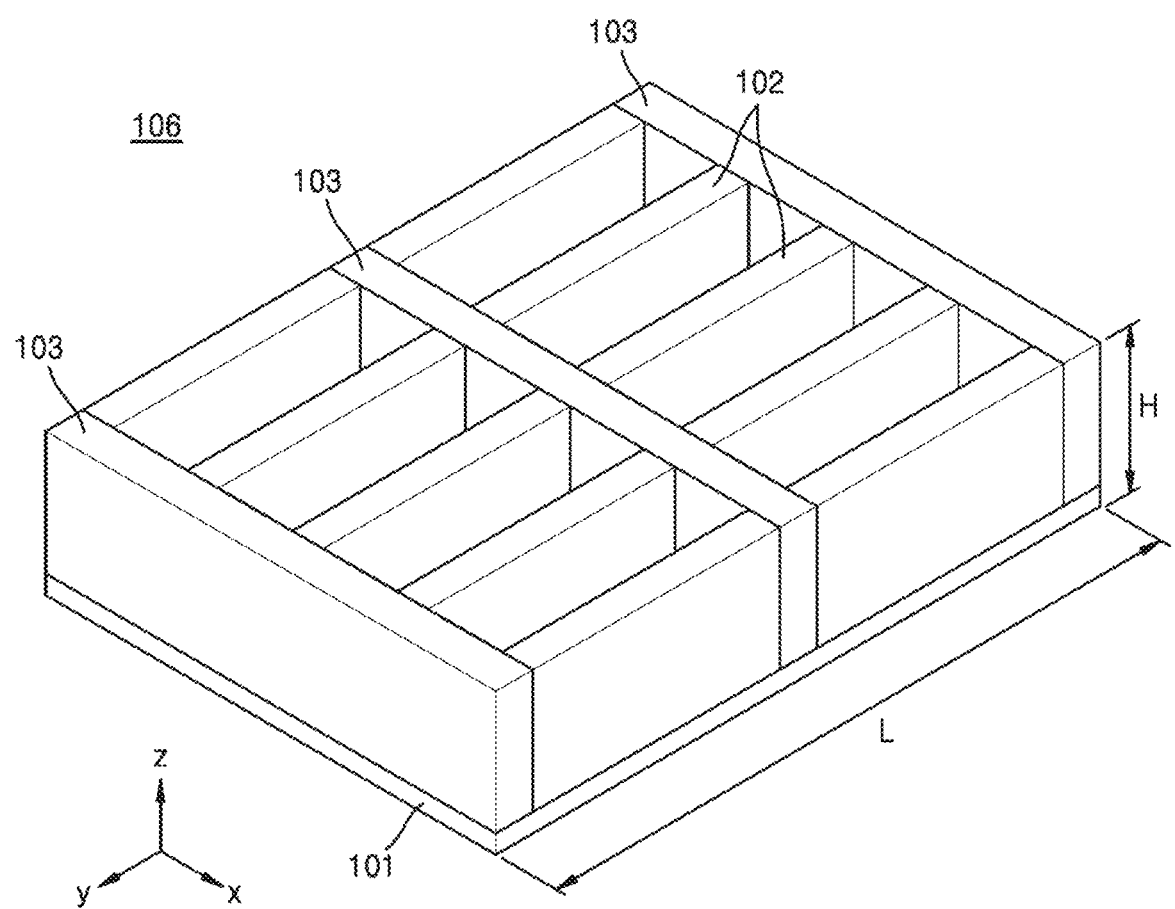
FIG. 9A is a perspective view of an embodiment of a module.
Figure 9B:
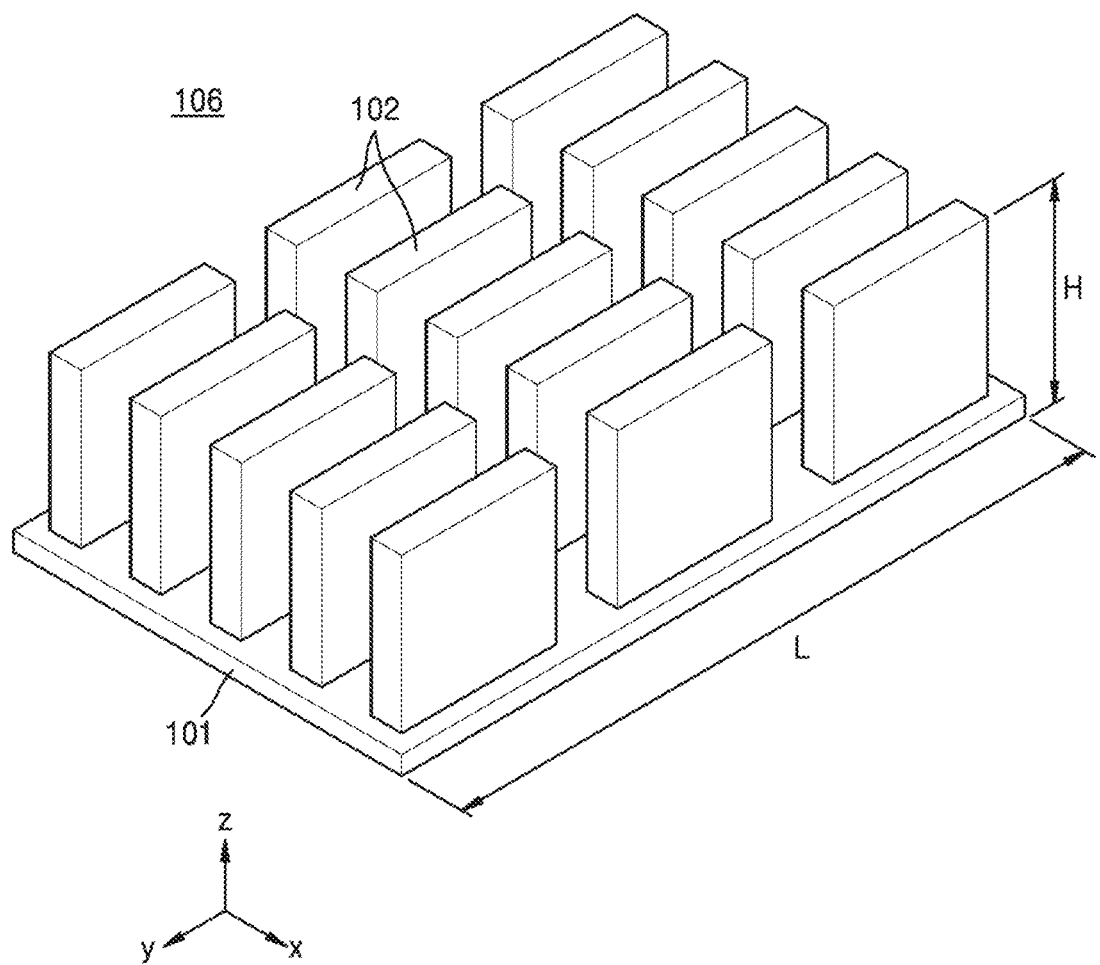
FIG. 9B is a perspective view of an embodiment of a module.

Referring to FIGS. 9A and 9B, the electrochemical device 100 includes a module 106 including the plurality of positive electrodes 102. The module 106 has a structure in which the plurality of positive electrodes 102 spaced apart from one another is supported by a supporter. Types of the supporter are not particularly limited. For example, the supporter may be a barrier rib 103 supporting a side surface of the module 106, or may be the positive electrode current collector 101 supporting a bottom surface of the module 106. In FIG. 9A, the supporter is the barrier rib 103 and the positive electrode current collector 101, and in FIG. 9B, the supporter is the positive electrode current collector 101.

An electrolyte layer, a negative electrode, and a negative electrode current collector layer are sequentially stacked on the module 106 to form the electrochemical device 100.

Referring to FIGS. 9A and 9B, the height of the module 106 may be for example, about 10 μm to about 5 mm, about 10 μm to about 1 mm, about 50 μm to about 1 mm, about 100 μm to about 500 μm, about 100 μm to about 400 μm, or about 100 μm to about 300 μm. The module 106 may comprise at least one barrier rib 103 in contact with the positive electrode 102, wherein the barrier rib is disposed in a direction perpendicular to the positive electrode 102. In the module 106, the barrier rib 103 is disposed in an x-direction and perpendicular to the positive electrode 102, which is disposed in a y-direction. As the barrier rib 103 supports both sides of the positive electrode 102, during charge and discharge of the electrochemical device 100, the module 106 is effectively prevented from being deformed and deteriorated due to expansion and/or shrinkage of the positive electrode 102. The length L of the module 106 may be, for example, about 20 μm to about 100 mm, about 20 μm to about 50 mm, about 20 μm to about 10 mm, about 100 μm to about 10 mm, about 200 μm to about 5,000 μm, about 200 μm to about 4,000 μm, or about 200 μm to about 3,000 μm. The barrier rib 103 has a different composition from the positive electrode 102, has and may have the same composition as the positive electrode 102. The positive electrode current collector 101 may have a flat sheet shape. The thickness of the positive electrode current collector 101 may be about 30 μm or less, about 20 μm or less, about 10 μm or less, about 5 μm or less, about 3 μm or less, or about 0.01 μm to about 30 μm. Referring to FIG. 9B, the module 106 does not include the barrier rib 103 as a supporter, and includes the positive electrode current collector 101 only as a supporter.

Figure 10:
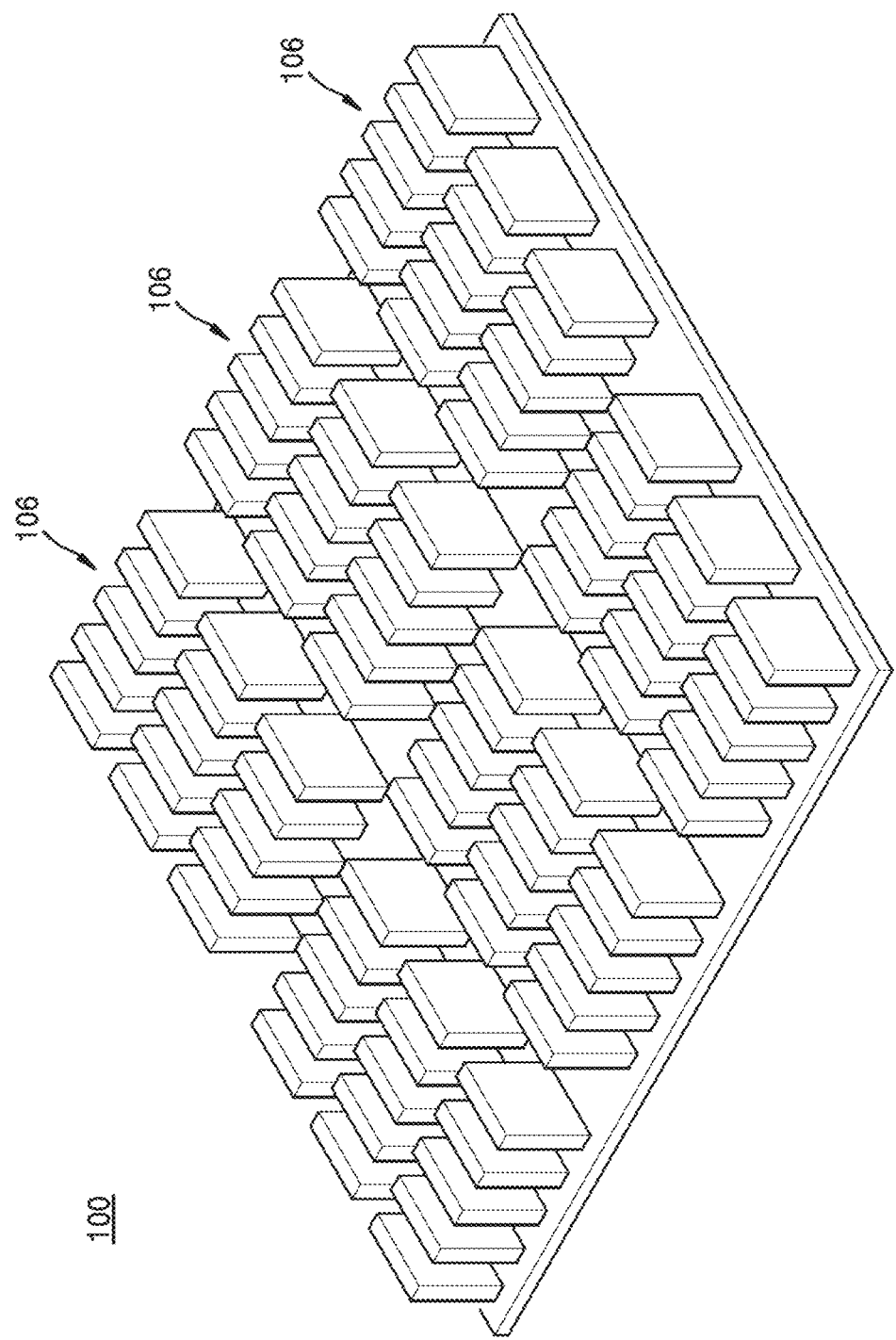
FIG. 10 is a cross-sectional view of an embodiment of an electrochemical device.

Referring to FIG. 10, an exemplary electrochemical device 100 includes a plurality of modules 106 spaced apart from one another. Since the electrochemical device 100 includes a plurality of modules, the deterioration occurring in one module is prevented from proceeding to the entire electrochemical device 100.

Referring to FIGS. 1 to 10, the positive electrode 102 and the negative electrode 112 exchange metal ions such as lithium ions or sodium ions with each other through the electrolyte layer 120 without being in direct contact with each other. The positive electrode current collector 101 is electrically connected to the positive electrode 102, and the negative electrode current collector layer 111 is electrically connected to the negative electrode 112. The thickness of the electrolyte layer 120 is, for example, about 20 μm or less, about 15 μm or less, about 10 μm or less, about 5 μm or less, about 4 μm or less, about 3 μm or less, about 2 μm or less, about 1 μm or less, about 0.5 μm or less, or about 0.1 μm or less, and about 0.01 μm or more. As the thickness of the electrolyte layer 120 decreases, the distance for ions from the positive electrode 102 to migrate to the negative electrode 112 decreases, so that the electrochemical device 100 has a decreased internal resistance and improved high-rate characteristics. In addition, when the electrolyte layer 120 included in the electrochemical device 100 is a solid electrolyte, the electrochemical device 100 does not encounter problems, such as leakage or ignition of an electrolytic solution, thus improving the stability thereof. The electrochemical device 100 may be manufactured in small sizes, and thus, the electrochemical device 100 may readily be used in batteries of small devices, such as mobile devices or wearable devices. The electrochemical device 100 may be, for example, used in cell phones, glasses, healthcare bands, or wrist watches.

The electrochemical device 100 may be, for example, a lithium battery. The positive electrode current collector 101 and the negative electrode current collector layer 111 may include, for example, electrically conductive metal, such as copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), and palladium (pd). A combination comprising at least one of the foregoing may be used. However, embodiments are not limited thereto, and any suitable current collector available in the art may be used. The positive electrode current collector 101 is, for example, an aluminum foil. The negative electrode current collector layer 111 may be, for example, a copper foil.

In the lithium battery, the positive active material is not particularly limited, and any suitable positive active material for lithium batteries may be used. The positive active material is a compound capable of reversible intercalation and deintercalation, or alloying and dealloying of lithium (e.g., a lithiated intercalation compound). The positive active material includes lithium cobalt oxide, lithium nickel cobalt manganese oxide, lithium nickel cobalt aluminum oxide, lithium iron phosphorous oxide, lithium manganese oxide, or a combination thereof. For example, the positive active material may be a lithium cobalt oxide such as $LiCoO_2$; a lithium nickel oxide such as $LiNiO_2$; a lithium manganese oxide such as $Li_{1+x}Mn_{2-x}O_4$ (0≤x≤0.33); a lithium manganese oxide such as $LiMnO_3$, $LiMn_2O_3$, or $LiMnO_2$; a lithium copper oxide such as $Li_2CuO_2$; a lithium iron oxide such as $LiFe_3O_4$; a lithium vanadium oxide such as $LiV_3O_8$; a copper vanadium oxide such as $Cu_2V_2O_7$; a vanadium oxide such as $V_2O_5$; a lithium nickel oxide such as $LiNi_{1-x}M_xO_2$ (wherein M is selected from Co, Mn, Al, Cu, Fe, Mg, B, and Ga, and x is from 0.01 to 0.3); a lithium manganese composite oxide such as $LiMn_{2-x}M_xO_2$ (wherein M may be at selected from Co, Ni, Fe, Cr, Zn, and Ta, and x is from 0.01 to 0.1) or $Li_2Mn_3MO_8$ (wherein M is selected from Fe, Co, Ni, Cu, and Zn); a lithium manganese oxide ($LiMn_2O_4$) with partial substitution of lithium by alkali earth metal ions; a disulfide compound; an iron molybdenum oxide such as $Fe_2(MoO_4)_3$, or a combination thereof. For example, the positive active material is selected from $LiCoO_2$, $LiNiO_2$, $LiMn_2O_4$, and $LiFePO_4$.

In the lithium battery, the negative active material is not particularly limited, and any suitable lithium battery negative active material may be used. The negative active material may be an alkali metal (e.g., lithium, sodium, or potassium), an alkaline earth metal (e.g., calcium, magnesium, or barium) and/or a certain transition metal (e.g., zinc), and an alloy thereof. A combination comprising at least one of the foregoing may be used. In particular, the negative active material is lithium, a lithium alloy, or a combination thereof. Lithium metal may be used as a negative active material. When lithium metal is used as a negative active material, a current collector may be omitted. Therefore, the volume and weight occupied by the current collector may decrease, and thus, specific energy and energy density of the electrochemical device 100 may be improved. An alloy of lithium metal and another negative active material is used as a negative active material. The other negative active material is a metal alloyable with lithium. Examples of the metal alloyable with lithium include Si, Sn, Al, Ge, Pb, Bi, Sb, a Si—Y' alloy (wherein Y' is an alkali metal, an alkaline earth metal, a Group 13 element, a Group 14 element, a transition metal, a rare earth element, or a combination thereof, and Y' is not Si), and a Sn—Y alloy (wherein Y' is an alkali metal, an alkaline earth-metal, a Group 13 element, a Group 14 element, a transition metal, a rare earth element, or a combination thereof, and Y' is not Sn). Y' is selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof. For example, the lithium alloy is selected from a lithium aluminum alloy, a lithium silicon alloy, a lithium tin alloy, a lithium silver alloy, and a lithium lead alloy.

In the lithium battery, the solid electrolyte included in each of the first electrolyte layer 121 and second electrolyte layer 122 of the electrolyte layer 120 is not particularly limited, and any suitable solid electrolyte available in the art may be used. The solid electrolyte may comprise $BaTiO_3$, $Pb(Zr,Ti)O_3$ ("PZT"), $Pb_{1-x}La_xZr_{1-y}Ti_yO_3$ ("PLZT") (wherein $0 \leq x \leq 1$ and $0 \leq y \leq 1$), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$, and $0<y<3$), lithium aluminum titanium phosphate ($Li_xAl_yTi_z(PO_4)_3$, wherein $0<x<2$, $0<y<1$, and $0<z<3$), $Li_{1+x+y}(Al, Ga)_x(Ti, Ge)_{2-x}Si_yP_{3-y}O_{12}$ (wherein $0 \leq x \leq 1$ and $0 \leq y \leq 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitrate ($Li_xN_y$, wherein $0<x<4$ and $0<y<2$), lithium phosphorous oxynitride (LiPON, $Li_x$-$PON_y$, wherein $0<x<4$ and $0<y<2$), $SiS_2$ type glass ($Li_xSi_yS_z$, wherein $0<x<3$, $0<y<2$, and $0<z<4$), $P_2S_5$ type glass ($Li_xP_yS_z$, wherein $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramic, garnet-based ceramic, $Li_{3+x}La_3M_2O_{12}$ (wherein M=Te, Nb, or Zr), or a combination thereof. In some embodiments, the solid electrolyte may be LiPON.

For example, the first electrolyte layer 121 and the second electrolyte layer 122 may have different compositions from each other. For example, the first electrolyte layer 121 and the second electrolyte layer 122 may each independently comprise includes a solid electrolyte comprising $Li_xPO_yN$, wherein $x=2y+3z-5$, $Li_xLa_yM_zO_{12}$ (M=Te, Nb, Zr, or a combination thereof and $0<x<3$, $0<y<3$, $0<z<3$), $Li_xTi_y(PO_4)_3$ wherein $0<x<2$, $0<y<3$, $Li_xAl_yTi_z(PO_4)_3$ wherein $0<x<2$, $0<y<1$, $0<z<3$, $Li_{1+x+y}(Al_aGa_{1-a})_x(Ti_bGe_{1-b})_{2-x}Si_yP_{3-y}O_{12}$ wherein $0<x<1$, $0<y<3$, $0<z<1$, $0<a<1$, and $0<b<1$, $Li_xLa_yTiO_3$ $0<x<2$, $0<y<3$, $Li_xM_yP_zS_w$ wherein (M=Ge, Si, Sn, or a combination thereof, and $0<x<4$, $0<y<1$, $0<z<1$, and $0<w<5$), $Li_xN_y$ $0<x<4$, $0<y<2$, $Li_xSi_yS_z$ $0<x<3$, $0<y<3$, $0<z<4$, $Li_xP_yS_z$ wherein $0<x<3$, $0<y<3$, $0<z<7$, or a combination thereof.

Referring to FIGS. 11A to 11G, a method of manufacturing an electrochemical device 100, according to an embodiment includes: disposing a plurality of positive electrodes 102 on a positive electrode current collector 101 in a vertical direction to be spaced apart from one another; disposing a first electrolyte layer 121 on the plurality of positive electrodes 102; disposing a second electrolyte layer 122 on the first electrolyte layer 121; disposing a negative electrode 112 on the second electrolyte layer 122; and disposing a negative electrode current collector 111 on the negative electrode 112. The electrochemical device 100 may be manufactured using a module 106 including a plurality of positive electrodes 102. The method of manufacturing an electrochemical device 100 may include: preparing a module 106 including a plurality of positive active materials; disposing the module 106 on a positive electrode current collector 101; disposing a first electrolyte layer 121 on the module 106; disposing a second electrolyte layer 122 on the first electrolyte layer 121; and disposing a negative electrode current collector 111 on the second electrolyte layer 122.

Figure 11A:
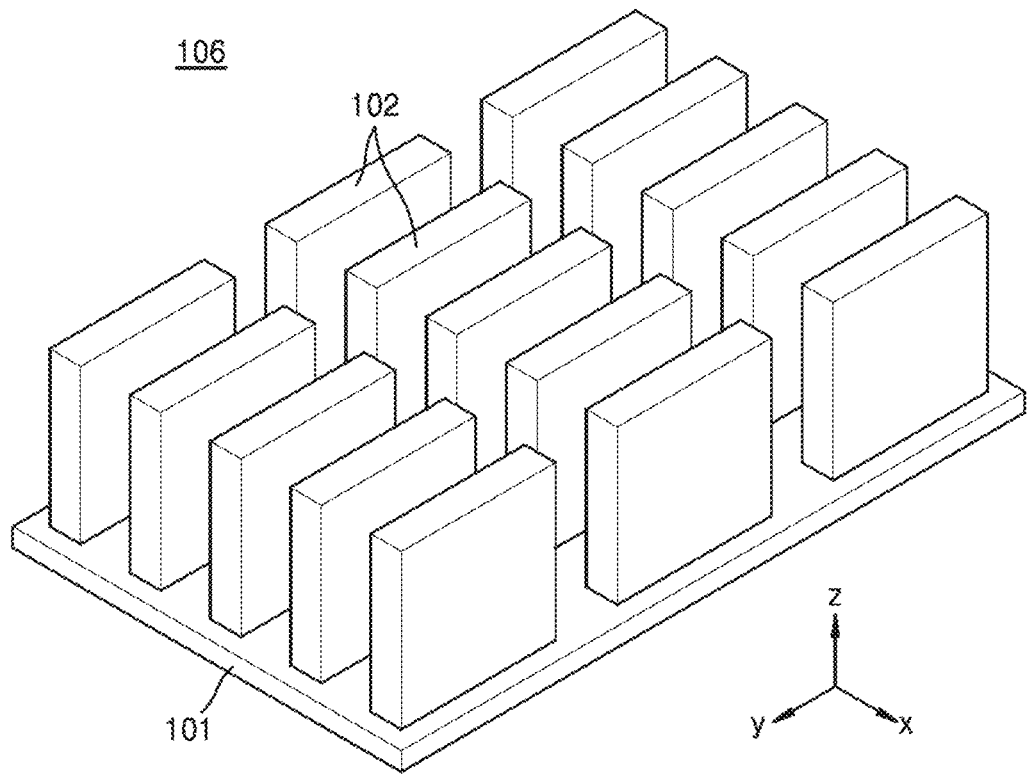
FIGS. 11A to 11F are a perspective view and cross-sectional views illustrating an embodiment of a method of manufacturing an electrochemical device.
Figure 11B:
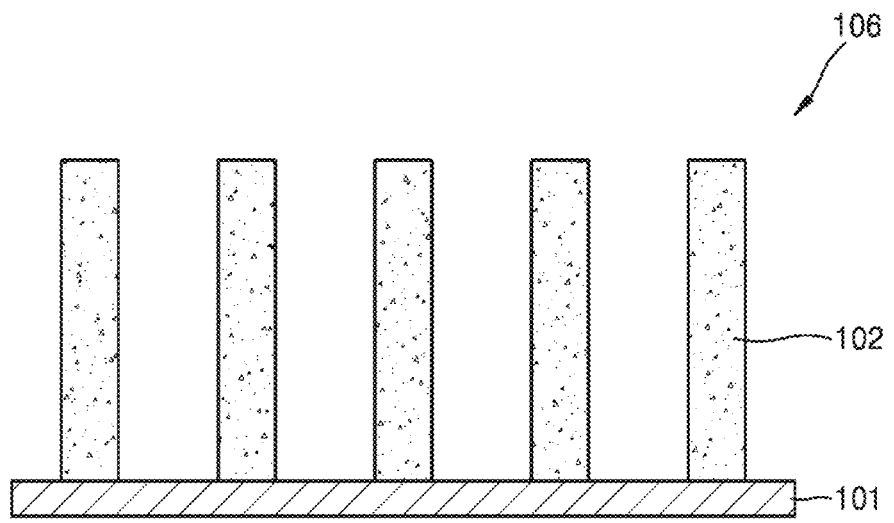

Referring to FIGS. 11A and 11B, a module 106 including a plurality of positive electrodes 102 may be prepared. Referring to FIGS. 11A and 11B, the module 106 has a configuration in which the plurality of positive electrodes 102 is arranged on the positive electrode current collector 101. In an embodiment, the module 106 may have a structure not including the positive electrode current collector 101, for example, the module 106 may have a structure including a barrier rib. When the module 106 not including the positive electrode collector 101 is used, disposing the module 106 on the positive electrode collector 101 is added. The module 106 may be attached to the positive electrode current collector 101 using a conductive adhesive and/or a conductive paste.

Figure 11C:
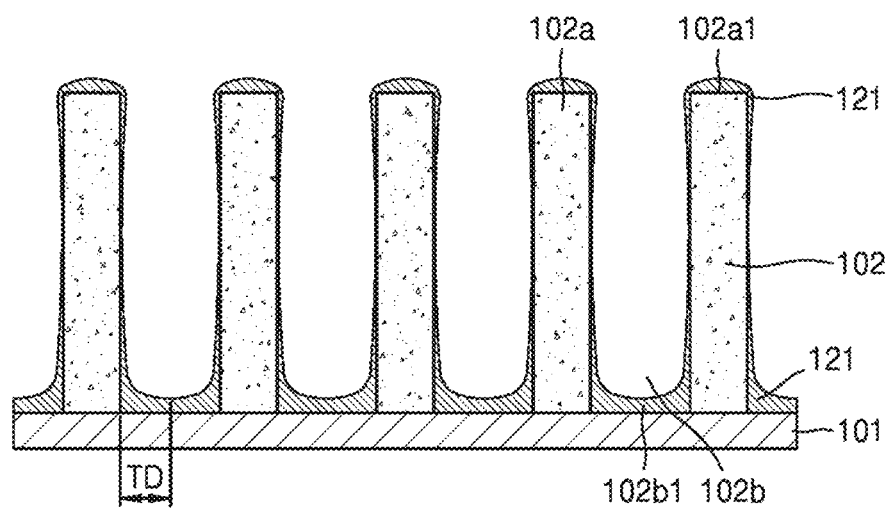

Referring to FIG. 11C, a first electrolyte layer 121 may be disposed on the module 106, e.g., on the plurality of positive electrodes 102. The first electrolyte layer 121 may be disposed by a wet method. The first electrolyte layer 121 may be a heat-treated product of a coating layer disposed by a method of spin coating, dip coating, bar coating, roll coating, spray coating, die coating, printing, or a combination thereof. A solution including a precursor of a first electrolyte constituting the first electrolyte layer 120 is prepared, and then the module 106 is coated with the solution, followed by drying and heat treatment, to dispose the first electrolyte layer 121 including the first electrolyte, which is a sintered product of the precursor. The concentration, viscosity, and coating amount of the solution including the precursor of the first electrolyte may be selected depending on the type or physical properties of the desired first electrolyte layer 121. When the concentration, viscosity, and/or coating amount of the solution including the precursor of the first electrolyte increases, the thickness of the first electrolyte layer 121 increases, and when the concentration, viscosity, and/or coating amount of the solution including the precursor of the first electrolyte decreases, the thickness of the first electrolyte layer 121 decreases. Since the first electrolyte layer 121 is formed by applying the solution including the precursor of the first electrolyte and then drying the applied solution, the first electrolyte may remain on the bottom 102b1 of the first indented portion, that is, on the surface of the positive electrode current collector 101 and the top 102a1 of the first protruding portion in the process of evaporating the solvent contained in the solution, and the content of the first electrolyte applied on the side surface of the positive electrode may be reduced at the middle portion of the depth to the bottom 102b1 of the first indented portion. An electrolyte layer having a thickness distribution different from that of a coating method may be obtained.

Accordingly, with reference to FIGS. 4A and 11C, a method of forming an electrochemical device 100 includes disposing a positive electrode 102 on a first surface of a positive electrode current collector 101; disposing a first electrolyte layer 121 including a first electrolyte on the positive electrode current collector 101 and on a first surface of the positive electrode 102, the first surface of the positive electrode 102 being orthogonal to the first surface of a positive electrode current collector 101; drying and heat-treating the first electrolyte layer 121; disposing a second electrolyte layer 122 on the first electrolyte layer 121; disposing a negative electrode 112 on the second electrolyte layer 122; and disposing a negative electrode 111 current collector 101 on the negative electrode 112 to provide the electrochemical device 100. A thickness tb1 of the first electrolyte layer 121 on the first surface of the positive electrode 102 at a location proximate to the positive electrode current collector 101 may be greater than a thickness tb3 of the first electrolyte layer 121 on the first surface of the positive electrode 102 at a location distal to the positive electrode current collector 101, and a thickness tb2 of the first electrolyte layer 121 on the first surface of the positive electrode 102 between the location of the first electrolyte layer 121 proximate to the positive electrode current collector 101 and the location of the first electrolyte layer 121 distal to the positive electrode current collector 101 may be less than the thickness tb3 of the first electrolyte layer 121 distal to the positive electrode current collector 101.

Figure 11D:
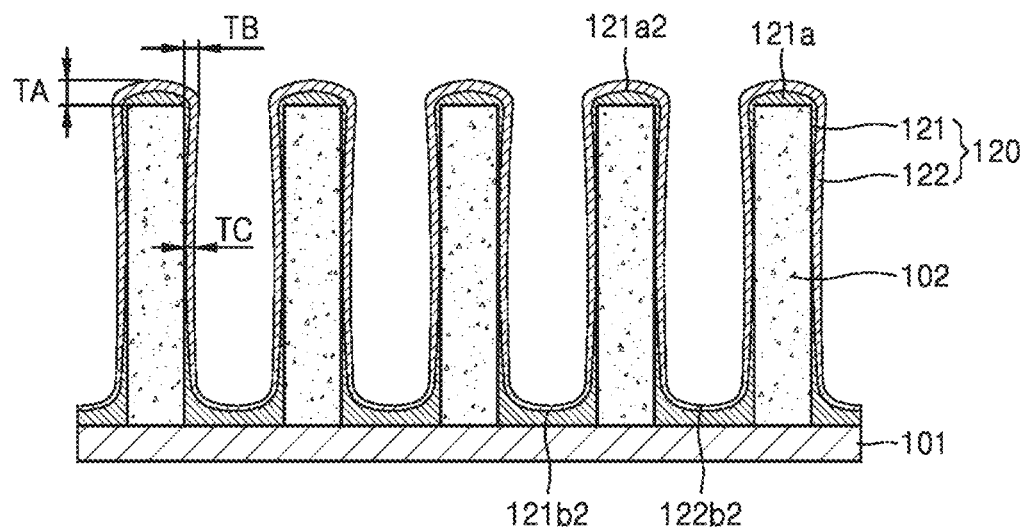

Referring to FIG. 11D, a second electrolyte layer 122 is disposed on the first electrolyte layer 121. The second electrolyte layer 122 may be disposed by a dry method. The second electrolyte layer 122 may be disposed by atomic layer deposition ("ALD"), chemical vapor deposition ("CVD"), physical vapor deposition ("PVD"), or a combination thereof. When the second electrolyte layer 122 is disposed by a dry method, the thickness of the second electrolyte layer is thick around the upper end surface 121a2 of the third protruding portion, and the thickness of the second electrolyte layer is thin around the bottom surface 121b2 of the third indented portion. Therefore, the second electrolyte layer 122 is disposed relatively thickly on the first electrolyte layer 121 disposed more thinly at the middle portion of the depth to the bottom surface 121b2 of the third indented portion. As a result, the step coverage of the electrolyte layer 120 including the first electrolyte layer 121 and the second electrolyte layer 122 increases on the side surface of the positive electrode 102.

Figure 11E:
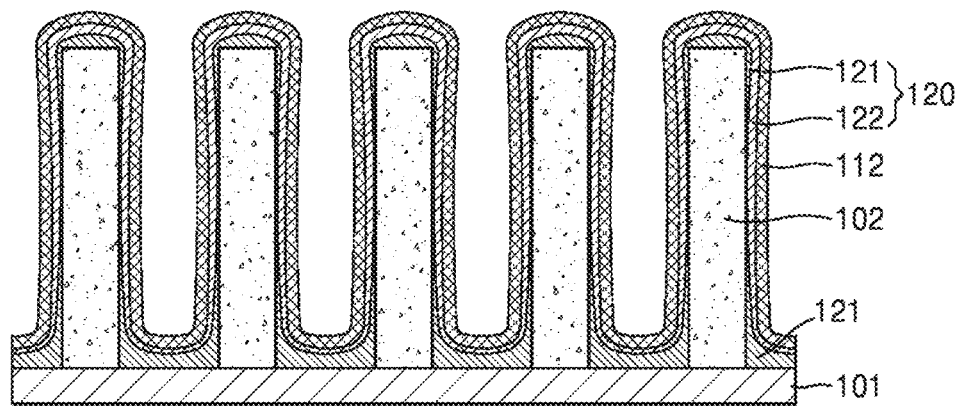

Referring to FIG. 11E, a negative electrode 112 is disposed on the second electrolyte layer 122. The method of disposing the negative electrode 112 may comprise deposition, but is not limited to deposition. Any suitable method may be used. The method of depositing the negative electrode 112 may be, for example, CVD, PVD, or the like.

Figure 11F:
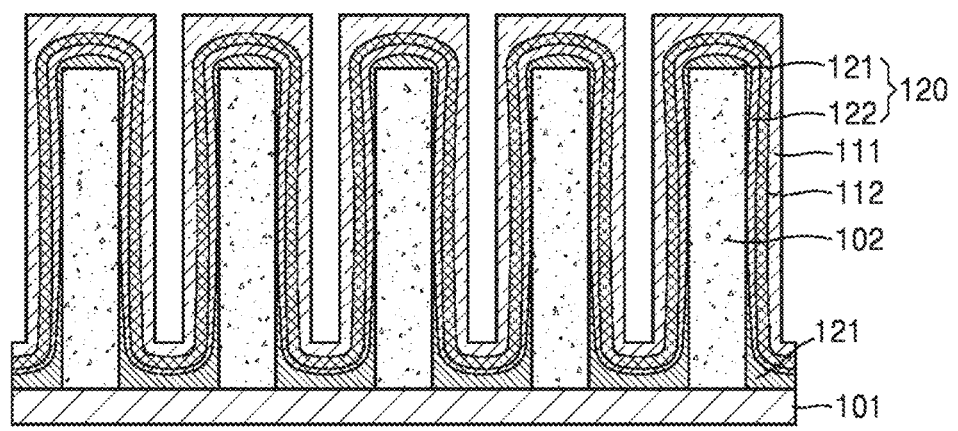

Referring to FIG. 11F, a negative electrode current collector 111 is disposed on the negative electrode 112 to manufacture an electrochemical device 100. The method of disposing the negative electrode current collector 111 may be deposition, but is not limited to deposition. Any suitable method may be used. The method of depositing the negative electrode current collector 111 may be, for example, thermal evaporation.

Hereinafter, the present disclosure will be described in more detail with reference to Examples and Comparative Examples below. However, these Examples are set forth to illustrate the present disclosure, and the scope of the present disclosure shall not limited thereto.

EXAMPLES

Preparation of Positive Electrolyte/Electrolyte Layer Laminate

Comparative Example 1: Single Electrolyte Layer (1)

Figure 12A:
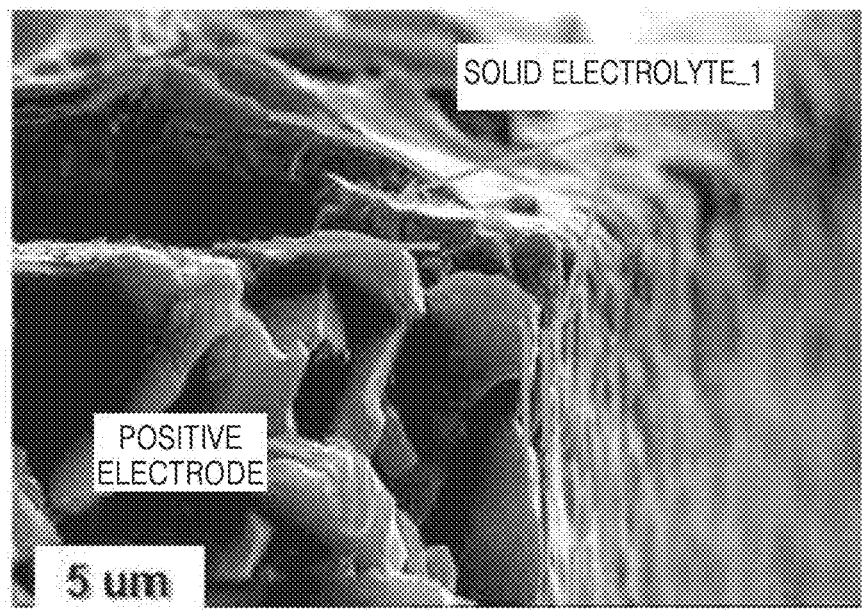
FIGS. 12A to 12C are SEM images of cross-sections of a laminate prepared in Comparative Example 1.
Figure 12B:
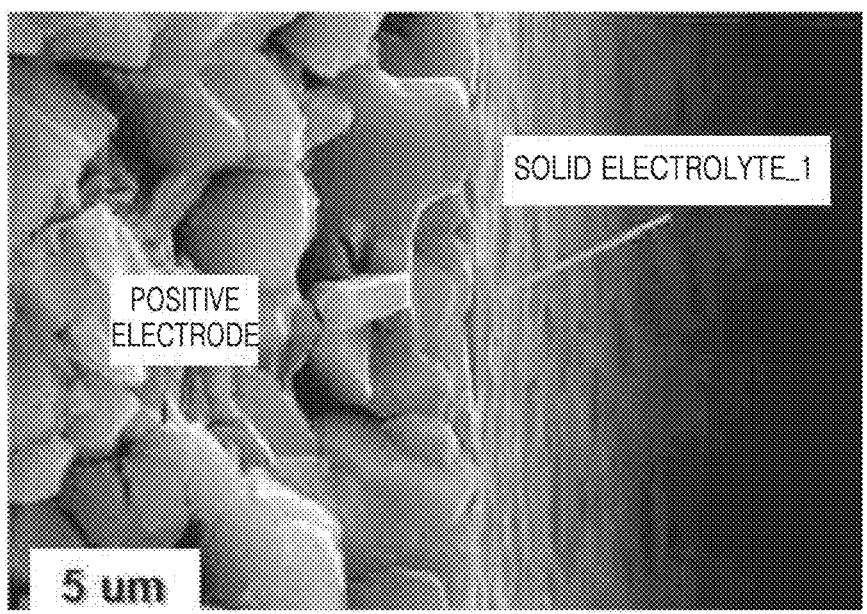
Figure 12C:
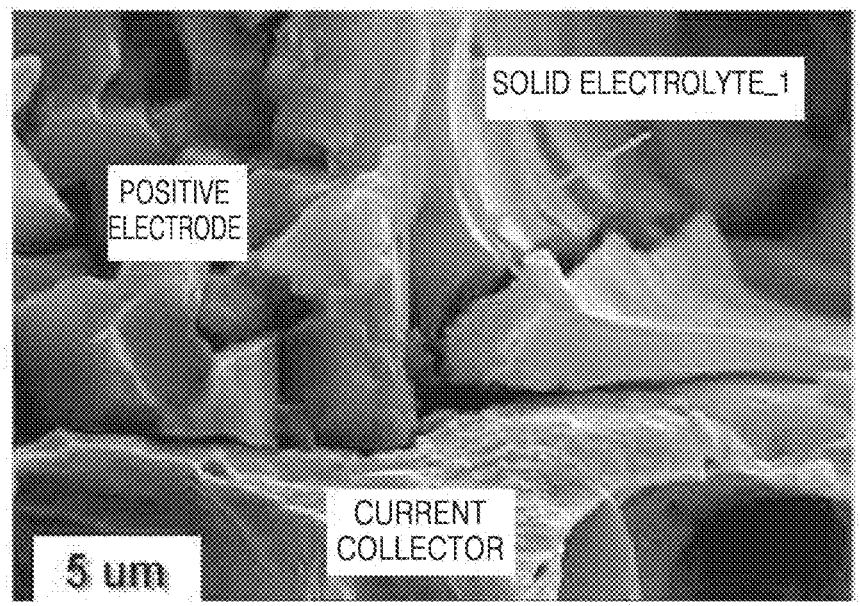

As shown in FIG. 11A, a module having a plurality of positive electrodes arranged to be spaced apart each other on a positive electrode current collector was prepared. The module was coated thereon with a precursor solution of lithium lanthanum zirconium oxide ("LiLZO"), followed by drying and sintering, to dispose an electrolyte layer on the plurality of the positive electrodes, thereby preparing a positive electrode/electrolyte layer laminate corresponding to FIG. 11C. FIGS. 12A to 12C show scanning electron microscope images of the cross-section of the prepared laminate.

The precursor solution of LiLZO was prepared by dissolving $LiNO_3$, $La(NO_3)_3 \cdot H_2O$, and $ZrO(NO_3)_2 \cdot H_2O$ in ethanol at a ratio of 14:3:2. The viscosity of the solution was maintained at 2.7 centipoise (cP). 0.4 cubic centimeters (cc) of the solution was injected into a positive electrode module having a size 7.0 millimeters (mm)×3.3 mm, and then applied by spin coating and dried. The spin coating was carried out at a speed of 6500 revolutions per minute (rpm) for 100 seconds. The positive electrode module coated with the dried LiLZO precursor was sintered on a hot plate at 400° C. for 10 minutes. The solution injection, coating, and sintering processes were repeated 20 times in total to form a LiLZO electrolyte layer.

As shown in FIGS. 12A to 12C, the thickness of the electrolyte layer constituting a side surface of an indented portion (that is, the thickness of the electrolyte layer disposed on the side surface of the positive electrode, wherein the thickness is measured in a direction parallel to the positive electrode current collector) was greater (i.e., thicker) at the bottom of the indented portion (see FIG. 12C), was medium at a protruding portion (see FIG. 12A), and was thinner (i.e., very thin or thinnest) at a middle portion of a depth from the top surface of the protruding portion to the bottom of the indented portion (see FIG. 12B). Thus, it was confirmed that the electrolyte layer having a shape shown in FIG. 11C was obtained.

Comparative Example 2: Single Electrolyte Layer (2)

As shown in FIG. 11A, a module having a plurality of positive electrodes arranged to be spaced apart each other on a positive electrode current collector was prepared. The module was coated thereon with LiPON using CVD to dispose an electrolyte layer on the plurality of the positive electrodes by deposition, thereby preparing a positive electrode/electrolyte layer laminate corresponding to FIG. 13D.

Figure 13A:
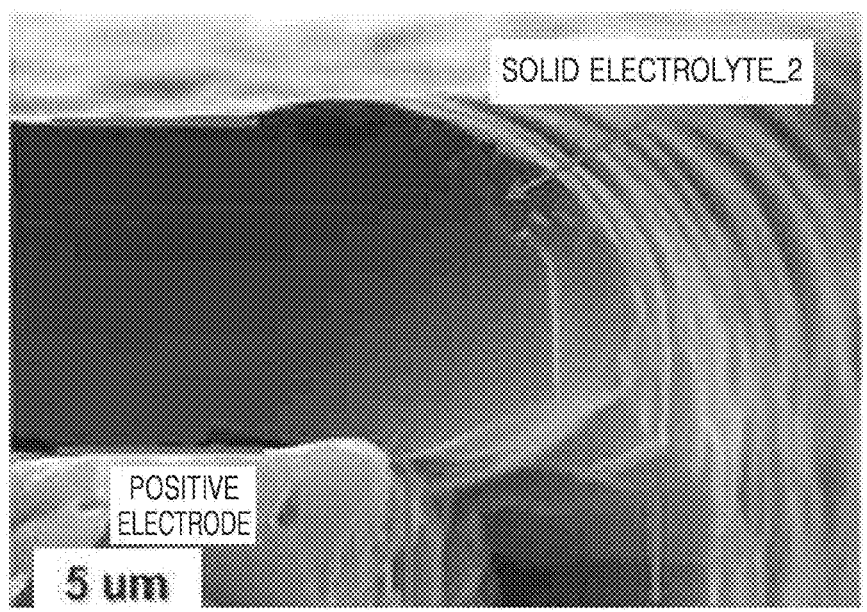
FIGS. 13A to 13C are SEM images of cross-sections of a laminate prepared in Comparative Example 2.
Figure 13B:
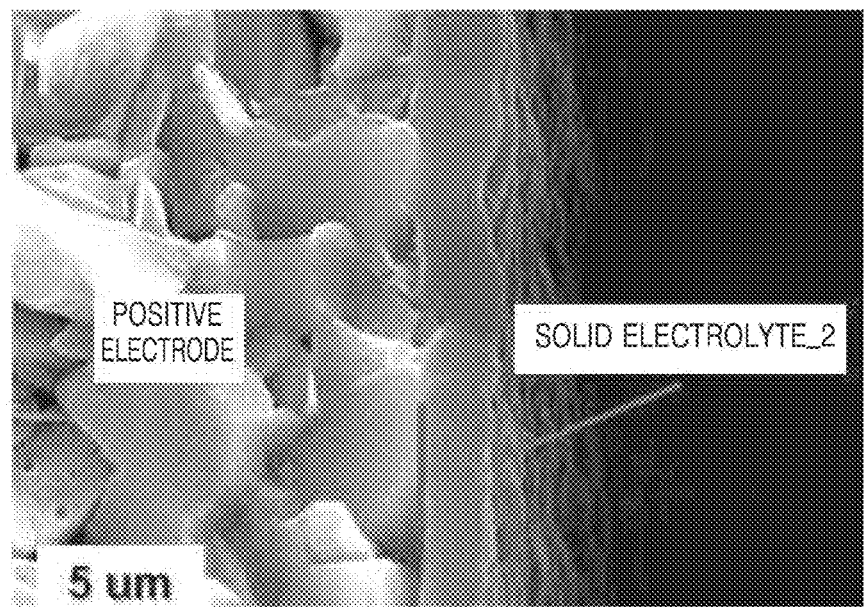
Figure 13C:
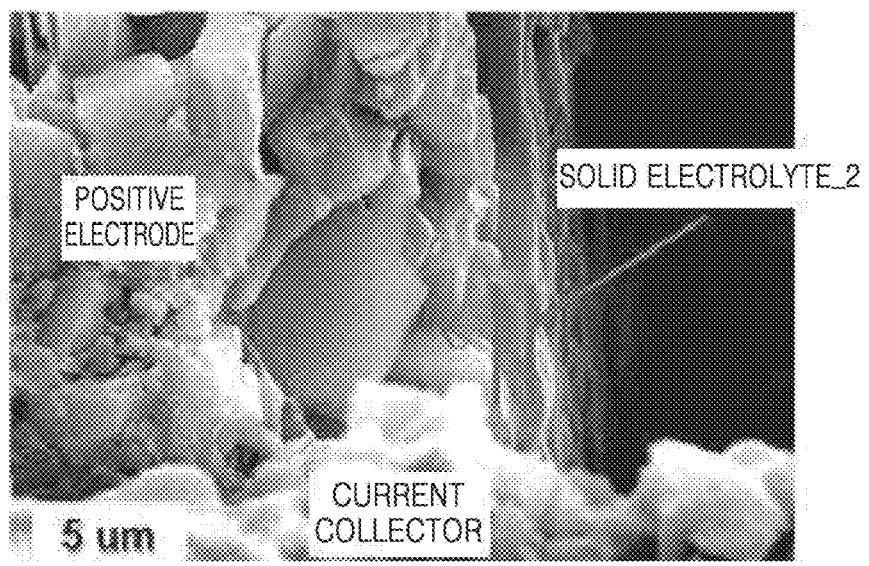
Figure 13D:
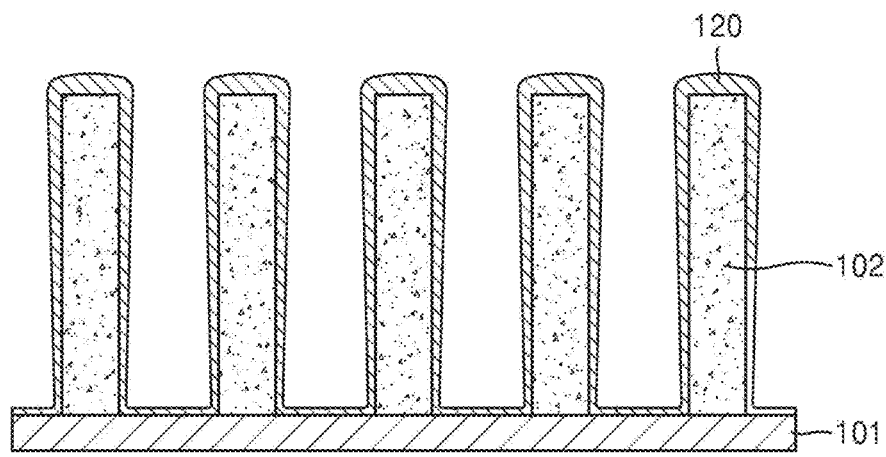
FIG. 13D is a cross-sectional view of the laminate prepared in Comparative Example 2.

FIGS. 13A to 13C show scanning electron microscope images of the cross-section of the prepared laminate.

Lithium tert-buoxide ((CH$_3$)$_3$COLi) and trimethyl phosphate ((CH$_3$O)$_3$PO) were used as precursor materials for CVD for forming LiPON. A positive electrode module was put into a CVD chamber heated to 300° C., and each of the precursor materials was injected using nitrogen gas. Nitrogen gas was additionally introduced to form nitrogen plasma at an RF power of 75 Watts (W), and nitrogen doping was performed on the deposited product. The nitrogen doping was performed for 30 hours to form a LiPON electrolyte layer.

As shown in FIGS. 13A to 13C, the thickness of the electrolyte layer constituting a side surface of an indented portion (that is, the thickness of the electrolyte layer disposed in a direction parallel to the positive electrode current collector from the side surface of the positive electrode) was greater (i.e., thicker) at a protruding portion (see FIG. 13A), was medium at a middle portion of a depth from the surface of the protruding portion to the bottom of the indented portion (see FIG. 13B), and was smaller (i.e., thinner) at the bottom of the indented portion (see FIG. 13C). That is, the thickness of the electrolyte layer continuously decreased from the protruding portion toward the bottom of the indented portion.

Example 1: Double Electrolyte Layer

As shown in FIG. 11A, a module having a plurality of positive electrodes arranged to be spaced apart each other on a positive electrode current collector was prepared. The module was coated thereon with a precursor solution of lithium lanthanum zirconium oxide ("LiLZO"), followed by drying and sintering, to dispose a first electrolyte layer on the plurality of positive electrodes, and then the first electrolyte layer was coated with LiPON by CVD to dispose a second electrolyte layer on the first electrolyte layer, thereby preparing a positive electrode/first electrolyte layer/second electrolyte laminate corresponding to FIG. 11D.

An LiLZO electrolyte layer, as a first electrolyte, was formed on a positive electrode module having a size of 7.0 mm×3.3 mm in the same manner as in Comparative Example 1. Then, a LiPON electrolyte layer, as a second electrolyte, was formed in the same manner as in Comparative Example 2.

Figure 14A:
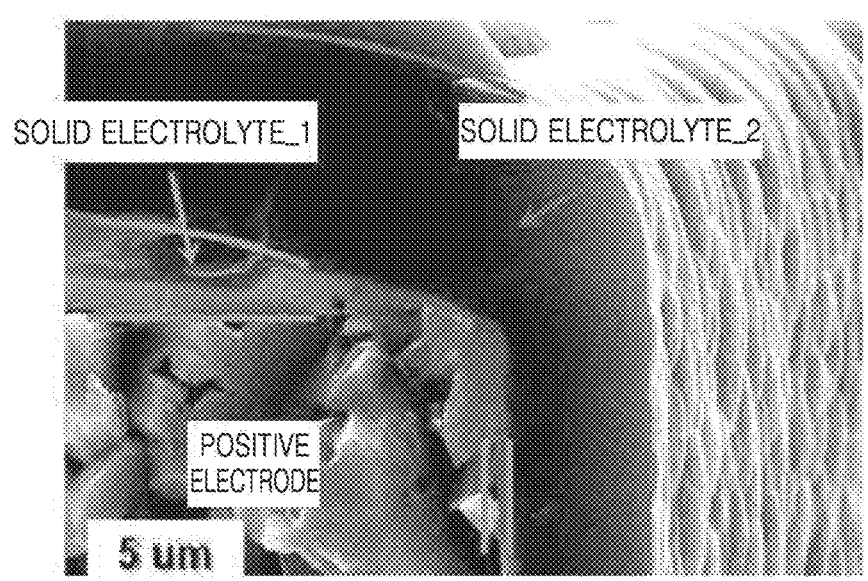
FIGS. 14A to 14C are SEM images of cross-sections of a laminate prepared in Example 1.
Figure 14B:
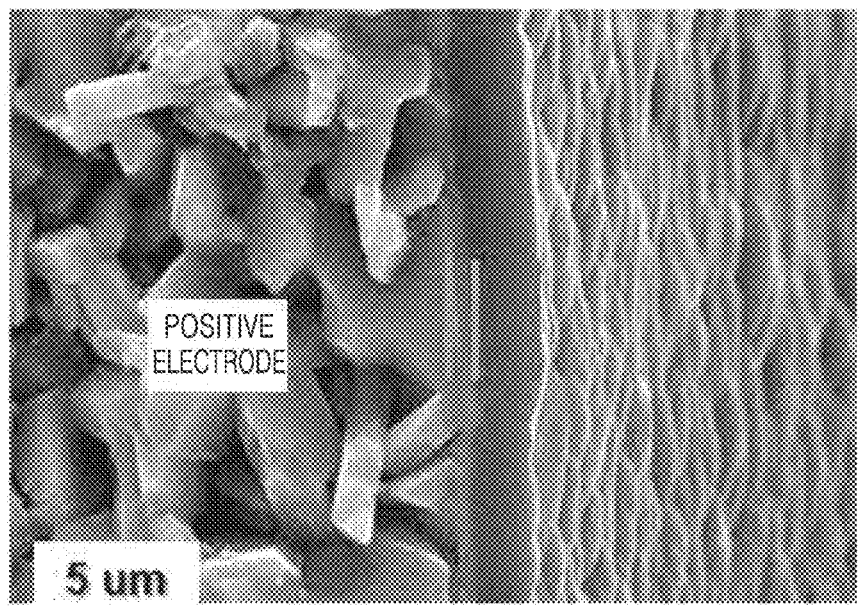
Figure 14C:
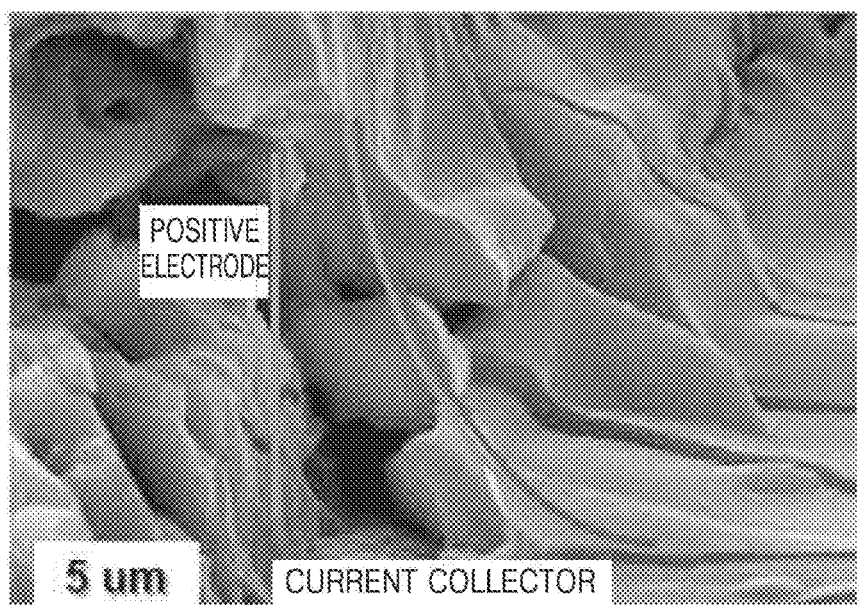

FIGS. 14A to 14C show scanning electron microscope images of the cross-section of the prepared laminate.

As shown in FIGS. 14A to 14C, the thickness of the electrolyte layer constituting a side surface of an indented portion (that is, the thickness of the electrolyte layer disposed on the side surface of the positive electrode, wherein the thickness is measured in a direction parallel to the positive electrode current collector) was greater (i.e., thicker) at the bottom of the indented portion (see FIG. 14C), was smaller (i.e., thinner) at a middle portion of a depth from the surface of the protruding portion to the bottom of the indented portion (see FIG. 14B), and was medium at the protruding portion (see FIG. 14A). However, a difference in the thickness of the electrolyte layer at the bottom of the indented portion (see FIG. 14C) and the thickness of the electrolyte layer at a middle portion of a depth from the top surface of the protruding portion to the bottom of the undented portion (see FIG. 14B) was decreased in comparison with the a corresponding difference in Comparative Example 1, i.e., a difference in the thickness of the electrolyte layer at the bottom of the indented portion and the thickness of the electrolyte layer at a middle portion of a depth from the top surface of the protruding portion to the bottom of the indented portion. Thus, it was confirmed that the electrolyte layer having a shape shown in FIG. 11D was obtained.

Evaluation Example 1: Measurement of Step Coverage

For the laminates prepared in Comparative Examples 1 and 2 and Example 1, the thicknesses of the electrolyte layers were measured, and step coverages were calculated according to Equations below. The results thereof are shown in Table 1 below.

In Table 1 below and FIGS. 11C and 11D, TA is a thickness of an electrolyte layer at a top surface of a protruding portion, TB is a thickness of an electrolyte layer at an side surface of a protruding portion, i.e., side surface adjacent to top of a protruding portion, TC is a thickness of an electrolyte layer at a middle side surface of a depth from the top surface of the protruding portion to the bottom of an indented portion (i.e., a depth of the indented portion), and TD is a thickness of an electrolyte layer at a side surface of a bottom of an indented portion.

TABLE 1

| | Comparative Example 1 | Comparative Example 2 | Example 1 |
|---|---|---|---|
| Thickness of electrolyte layer at top surface of protruding portion ("TA") | 2 μm | 10 μm | 7 μm |
| Thickness of electrolyte layer at side surface of protruding portion ("TB") | 0.5 μm | 7 μm | 4.7 μm |
| Thickness of electrolyte layer at middle side surface of depth of indented portion ("TC") | 0.3 μm | 2.5 μm | 2.5 μm |
| Thickness of electrolyte layer at side surface of bottom of indented portion ("TD") | 5 μm | 1.5 μm | 5 μm |
| Side step coverage ("SCs") | 15% | 25% | 36% |
| Bottom side step coverage ("BSCs") | 250% | 15% | 71% |

As shown in Table 1 above, the side step coverage of the electrolyte layer of Example 1 has increased as compared with those of the electrolyte layers of Comparative Examples 1 and 2.

Further, the bottom side step coverage of the electrolyte layer of Example 1 has increased remarkably as compared with that of the electrolyte layer of Comparative Example 2.

Although the bottom side step coverage of the electrolyte layer of Comparative Example 1 is the greatest, the thickness (TB and/or TC) of the electrolyte layer is excessively thin at the side surface of the protruding portion and/or at the middle side surface of depth of the indented portion, which may cause a short circuit or the like.

The side step coverage is calculated by Equation SCs=TC/TA×100%, and the bottom side step coverage is calculated by Equation BSCs=TD/TA×100%. TA and TC correspond to Tt and Ts of Equation 1, respectively.

As apparent from the foregoing description, according to an embodiment, a multilayered electrolyte layer having an improved step coverage can reduce a short-circuit rate during charge and discharge, and can prevent the overcharging of a positive electrode and the collapse of an electrode structure, thereby increasing the lifetime of an electrochemical device.

It should be understood that embodiments described herein should be considered in a descriptive sense only and not for purposes of limitation. Descriptions of features, aspects, or advantages within each embodiment should be considered as available for other similar features, aspects, or advantages in other embodiments.

While an embodiment have been described with reference to the figures, it will be understood by those of ordinary skill in the art that various changes in form and details may be made therein without departing from the spirit and scope as defined by the following claims.

What is claimed is:

1. An electrochemical device, comprising:
a positive electrode current collector;
a plurality of positive electrodes disposed on the positive electrode current collector;
an electrolyte layer disposed on the plurality of positive electrodes;
a negative electrode disposed on the electrolyte layer;
a negative electrode current collector disposed on the negative electrode; and
a first protruding portion comprising a positive electrode of the plurality of positive electrodes, wherein adjacent positive electrodes define a first indented portion between the adjacent positive electrodes of the plurality of positive electrodes,
wherein the electrolyte layer comprises a second protruding portion and a second indented portion, wherein the second protruding portion is disposed on the first protruding portion and wherein the second indented portion is on the first indented portion,
wherein the electrolyte layer comprises a first electrolyte layer and a second electrolyte layer, and wherein the second electrolyte layer is between the first electrolyte layer and the negative electrode,
wherein the first electrolyte layer comprises a third protruding portion and a third indented portion, the third protruding portion being disposed on the first protruding portion and the third indented portion disposed on the first indented portion,
wherein the second electrolyte layer comprises a fourth protruding portion and a fourth indented portion, the fourth protruding portion disposed on the third protruding portion and the fourth indented portion disposed on the third indented portion, and
wherein
the third indented portion of the first electrolyte layer comprises a side surface, and a thickness of the first electrolyte layer at a location proximate to the positive electrode current collector is greater than a thickness of the first electrolyte layer at a location distal to the positive electrode current collector, or
a surface of the third protruding portion of the first electrolyte layer that is distal to the positive electrode current collector is a curved surface, or
each of the third indented portion and the fourth indented portion comprises a side surface, and a surface of the second electrolyte layer constituting the side surface of the fourth indented portion is not parallel to a surface of the first electrolyte layer constituting the side surface of the third indented portion, or
the fourth indented portion of the second electrolyte layer comprises a side surface, and wherein a thickness of the second electrolyte layer constituting the side surface of the fourth indented portion is thinnest at a location of the fourth indented portion that is proximate to the positive electrode current collector.

2. The electrochemical device of claim 1,
wherein the third indented portion of the first electrolyte layer comprises a side surface, and
wherein a thickness of the first electrolyte layer at a location proximate to the positive electrode current collector is greater than a thickness of the first electrolyte layer at a location distal to the positive electrode current collector.

3. The electrochemical device of claim 2,
wherein the first electrolyte layer constituting a side surface of the third indented portion comprises a portion having a thickness of about 2 micrometers or greater.

4. The electrochemical device of claim 2,
wherein the thickness of the first electrolyte layer constituting the side surface of the third indented portion is thinnest at a location between about 10% to about 90% of a total depth of the third indented portion.

5. The electrochemical device of claim 2,
wherein a surface of the third indented portion proximate to the positive electrode current collector is a curved surface.

6. The electrochemical device of claim 5,
wherein the curved surface is convexly disposed in a direction of the positive electrode current collector, and wherein the curved surface has a radius of curvature of about 10 micrometers or greater.

7. The electrochemical device of claim 2,
wherein at least a part of a surface of the third indented portion proximate to the positive electrode current collector is a flat surface, and
wherein a connected portion between the surface of the third indented portion proximate to the positive electrode current collector and the side surface of the third indented portion is a curved surface.

8. The electrochemical device of claim 1,
wherein a surface of the third protruding portion of the first electrolyte layer that is distal to the positive electrode current collector is a curved surface.

9. The electrochemical device of claim 8,
wherein the curved surface is convexly disposed in a direction opposite to the positive electrode current collector, and
wherein the curved surface has a radius of curvature of 10 micrometers or greater.

10. The electrochemical device of claim 1,
wherein the fourth indented portion of the second electrolyte layer comprises a side surface, and wherein a thickness of the second electrolyte layer constituting the side surface of the fourth indented portion is thinnest at a location of the fourth indented portion that is proximate to the positive electrode current collector.

11. The electrochemical device of claim 10,
wherein the thickness of the second electrolyte layer constituting the side surface of the fourth indented portion decreases in a direction towards the portion of the fourth indented portion that is proximate to the positive electrode current collector.

12. A electrochemical device, comprising:
a positive electrode current collector;
a plurality of positive electrodes disposed on the positive electrode current collector;
an electrolyte layer disposed on the plurality of positive electrodes;
a negative electrode disposed on the electrolyte layer; and
a negative electrode current collector disposed on the negative electrode, wherein the electrolyte layer comprises a first electrolyte layer and a second electrolyte layer, and wherein the second electrolyte layer is between the first electrolyte layer and the negative electrode, and wherein a surface of the first electrolyte layer is not parallel to a surface of the second electrolyte layer.

13. The electrochemical device of claim 1, wherein each of the third indented portion and the fourth indented portion comprises a side surface, and wherein a surface of the second electrolyte layer constituting the side surface of the fourth indented portion is not parallel to a surface of the first electrolyte layer constituting the side surface of the third indented portion.

14. The electrochemical device of claim 1, further comprising:

a module comprising the plurality of positive electrodes.

15. The electrochemical device of claim 1, further comprising:

a plurality of modules spaced apart from each other.

16. The electrochemical device of claim 14, wherein the module comprises a barrier rib contacting the plurality of positive electrodes.

17. The electrochemical device of claim 1, wherein the first electrolyte layer and the second electrolyte layer have different compositions than each other.

18. The electrochemical device of claim 1, wherein the first electrolyte layer comprises $Li_xPO_yN_z$ wherein $x=2y+3z-5$, $Li_xLa_yM_zO_{12}$ wherein M is Te, Nb, Zr, or a combination thereof, $0<x<3$, $0<y<3$ and $0<z<3$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0<x<1$, $0<y<3$, $0<z<1$, $0<a<1$, and $0<b<1$, $Li_xLa_yTiO_3$ wherein $0<x<2$ and $0<y<3$, $Li_xM_yP_zS_w$ wherein M is Ge, Si, Sn, or a combination thereof and $0<x<4$, $0<y<1$, and $0<z<1$, and $0<w<5$, $Li_xN_y$ wherein $0<x<4$ and $0<y<2$, $Li_xSi_yS_z$ wherein $0<x<3$, $0<y<3$ and $0<z<4$, $Li_xP_yS_z$ wherein $0<x<3$, $0<y<3$, and $0<z<7$, or a combination thereof.

19. The electrochemical device of claim 1, wherein the first electrolyte layer comprises $Li_xPO_yN_z$ wherein $x=2y+3z-5$, $Li_xLa_yM_zO_{12}$ wherein M is Te, Nb, Zr, or a combination thereof, $0<x<3$, $0<y<3$ and $0<z<3$, $Li_xTi_y(PO_4)_3$ wherein $0<x<2$ and $0<y<3$, $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0<x<1$, $0<y<3$, $0<z<1$, $0<a<1$, and $0<b<1$, $Li_xLa_yTiO_3$ wherein $0<x<2$ and $0<y<3$, $Li_xM_yP_zS_w$ wherein M is Ge, Si, Sn, or a combination thereof and $0<x<4$, $0<y<1$, and $0<z<1$, and $0<w<5$, $Li_xN_y$ wherein $0<x<4$ and $0<y<2$, $Li_xSi_yS_z$ wherein $0<x<3$, $0<y<3$ and $0<z<4$, $Li_xP_yS_z$ wherein $0<x<3$, $0<y<3$, and $0<z<7$, or a combination thereof.

20. The electrochemical device of claim 1, wherein the first electrolyte layer and the second electrolyte layer are disposed by different methods than each other.

21. The electrochemical device of claim 1, wherein the first electrolyte layer is disposed by a wet method, and wherein the second electrolyte layer is disposed by a dry method.

22. The electrochemical device of claim 1, wherein the first electrolyte layer is a heat-treated product of a coating layer disposed by spin coating, dip coating, bar coating, roll coating, spray coating, die coating, printing, or a combination thereof.

23. The electrochemical device of claim 1, wherein the second electrolyte layer is disposed by a method selected from atomic layer deposition, chemical vapor deposition, and physical vapor deposition.

24. A method of forming the electrochemical device of claim 1, the method comprising:

disposing a positive electrode of the plurality of positive electrodes on a first surface of the positive electrode current collector;

disposing the first electrolyte layer including a first electrolyte on a first surface of the positive electrode by a wet method, the first surface of the positive electrode being orthogonal to the first surface of the positive electrode current collector;

disposing the second electrolyte layer on the first electrolyte layer;

disposing the negative electrode on the second electrolyte layer; and disposing the negative electrode current collector on the negative electrode to provide the electrochemical device.

* * * * *